US008867325B2

(12) United States Patent
Murakami

(10) Patent No.: US 8,867,325 B2
(45) Date of Patent: Oct. 21, 2014

(54) OPTICAL PICKUP APPARATUS HAVING DIFFRACTIVE ELEMENT FOR FOCUSING AND TRACKING PLURALITY OF LIGHT TYPES

(75) Inventor: Shinzoh Murakami, Osaka (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 179 days.

(21) Appl. No.: 13/635,860

(22) PCT Filed: May 16, 2011

(86) PCT No.: PCT/JP2011/061226
§ 371 (c)(1),
(2), (4) Date: Sep. 18, 2012

(87) PCT Pub. No.: WO2011/142477
PCT Pub. Date: Nov. 17, 2011

(65) Prior Publication Data
US 2013/0010178 A1    Jan. 10, 2013

(30) Foreign Application Priority Data
May 14, 2010  (JP) .............................. 2010-112688
Apr. 19, 2011  (JP) .............................. 2011-093201

(51) Int. Cl.
| G11B 7/00 | (2006.01) |
| G11B 7/1353 | (2012.01) |
| G11B 7/131 | (2012.01) |
| G11B 7/1381 | (2012.01) |
| G11B 7/09 | (2006.01) |

(52) U.S. Cl.
CPC ............ *G11B 7/1381* (2013.01); *G11B 7/1353* (2013.01); *G11B 7/131* (2013.01); *G11B 2007/0006* (2013.01); *G11B 7/0916* (2013.01)

USPC ....................................................... 369/44.41

(58) Field of Classification Search
None
See application file for complete search history.

(56) References Cited

U.S. PATENT DOCUMENTS 5,894,464 A * 4/1999 Kim et al. ................. 369/112.12
6,072,579 A * 6/2000 Funato .......................... 356/457
(Continued)

FOREIGN PATENT DOCUMENTS

JP  2002-92933   3/2002
JP  2002-123952  4/2002
(Continued)

OTHER PUBLICATIONS

International Preliminary Report on Patentability and Written Opinion dated Nov. 20, 2012, directed to International Application No. PCT/JP2011/061226; 9 pages.

(Continued)

*Primary Examiner* — Brenda Bernardi
(74) *Attorney, Agent, or Firm* — Morrison & Foerster LLP

(57) ABSTRACT

There is provided an optical pickup apparatus. In an optical pickup apparatus, a focus diffraction region includes focus regions of which a number of types is equal to a number of types of light that can be emitted by a light source. The types of the focus regions correspond to the respective types of light, the respective focus regions diffract the corresponding types of light toward same positions of focus light-receiving regions. The focus regions include a plurality of focus segmented regions. The plurality of focus segmented regions of the respective types of focus regions are periodically distributed in the focus diffraction region, and at least some of the focus segmented regions are disposed to be adjacent to focus segmented regions for different types of light.

7 Claims, 15 Drawing Sheets

(56) References Cited

U.S. PATENT DOCUMENTS

| | | |
|---|---|---|
| 6,314,068 B1 | 11/2001 | Sano et al. |
| 6,327,231 B1 | 12/2001 | Sano et al. |
| 6,418,095 B1 | 7/2002 | Sano et al. |
| 6,418,107 B1 | 7/2002 | Sano et al. |
| 6,744,707 B1 | 6/2004 | Sano et al. |
| 7,339,877 B2 * | 3/2008 | Aiki et al. ............... 369/112.24 |
| 7,345,982 B2 * | 3/2008 | Fukasawa et al. ....... 369/112.09 |
| 2001/0033528 A1 | 10/2001 | Sano et al. |
| 2002/0018432 A1 | 2/2002 | Ohuchida |
| 2002/0024916 A1 | 2/2002 | Ueyama et al. |
| 2004/0085872 A1 | 5/2004 | Sano et al. |
| 2004/0190398 A1 | 9/2004 | Sano et al. |
| 2005/0088948 A1 | 4/2005 | Ohuchida |
| 2005/0141391 A1 | 6/2005 | Ueyama et al. |

FOREIGN PATENT DOCUMENTS

| | | | |
|---|---|---|---|
| JP | 2003-248962 | 9/2003 | |
| JP | 2003248962 A * | 9/2003 | ............ G11B 7/135 |
| JP | 2005-285318 | 10/2005 | |
| JP | 2007-287278 | 11/2007 | |

OTHER PUBLICATIONS

International Search Report mailed Aug. 9, 2011, directed towards International Application No. PCT/JP2011/061226; 4 pages.

* cited by examiner

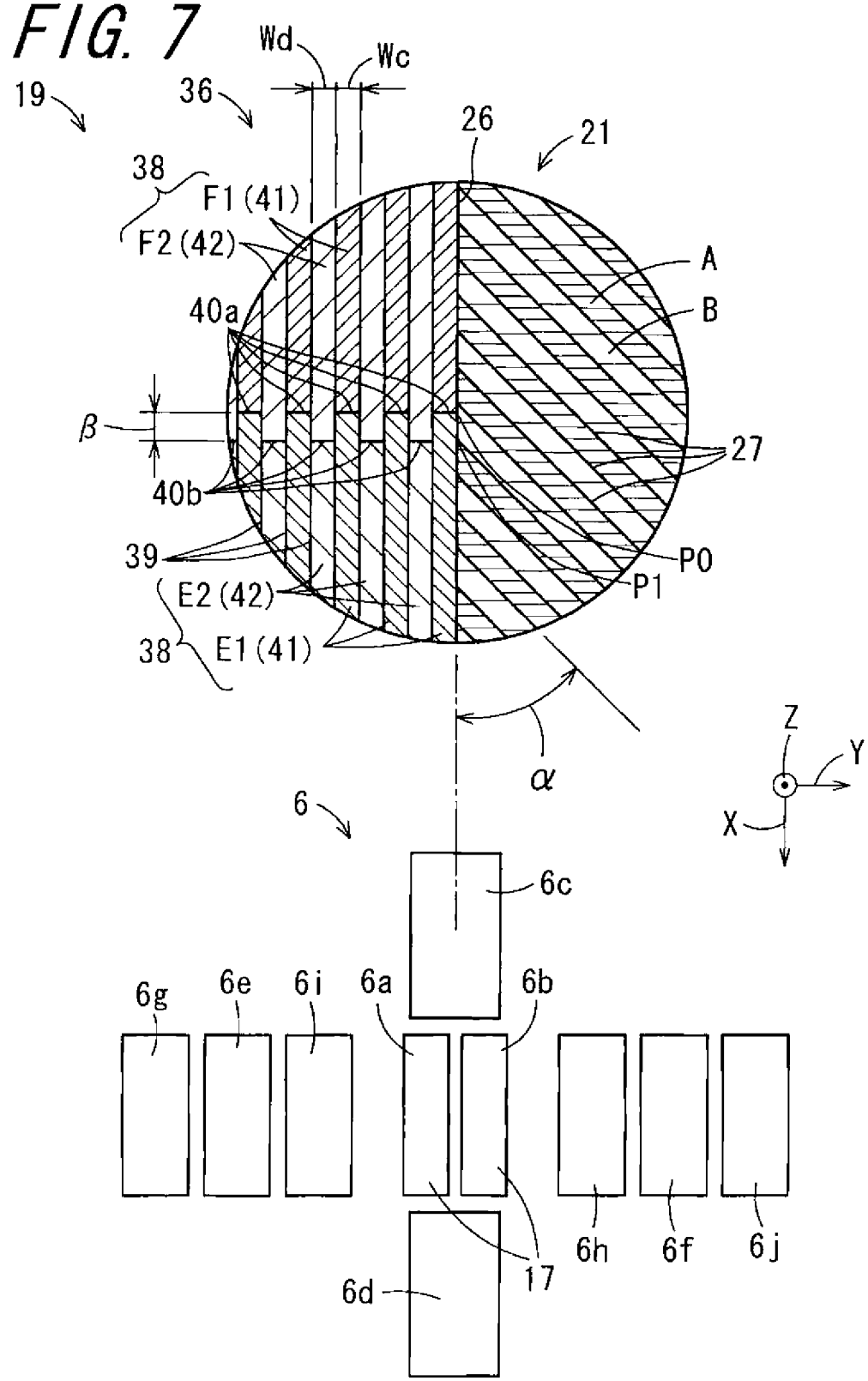

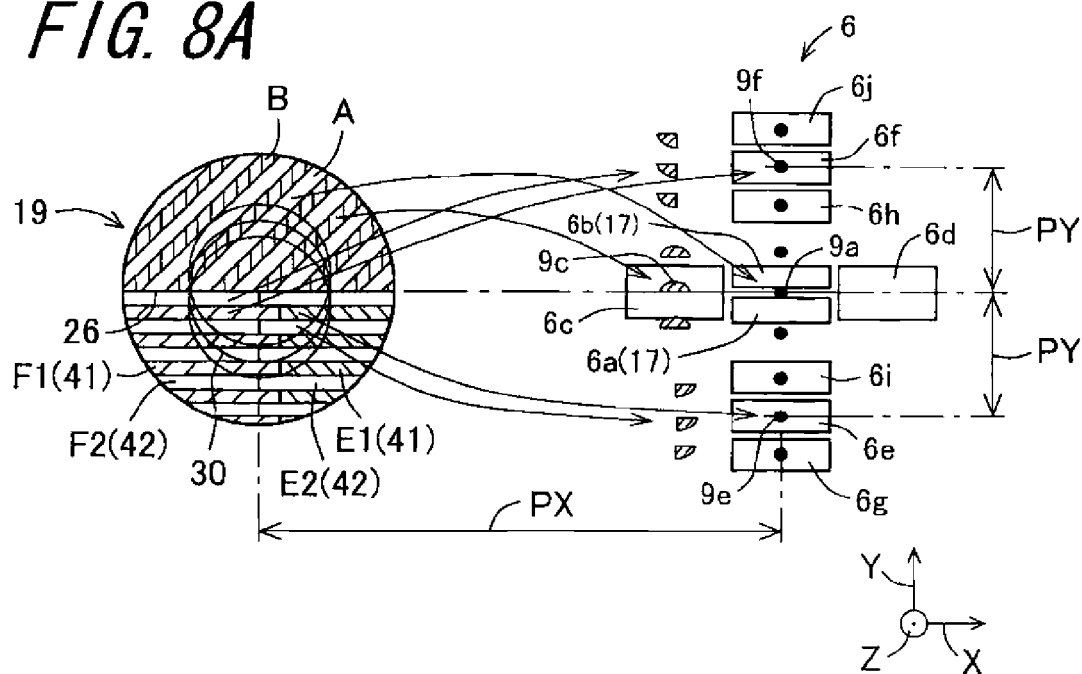
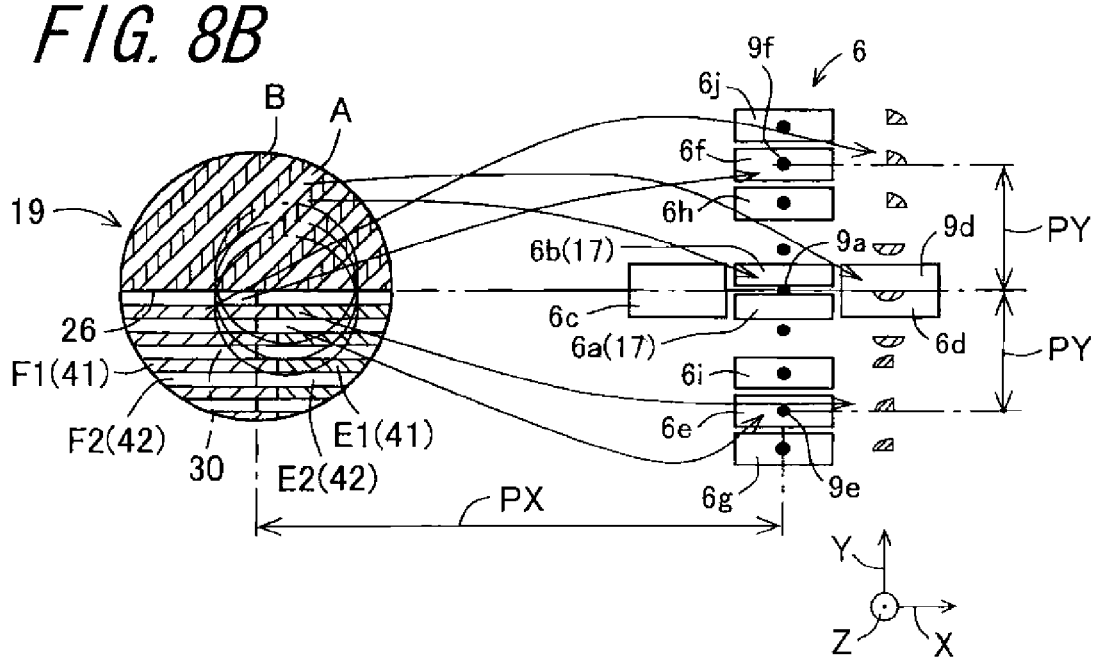

OPTICAL PICKUP APPARATUS HAVING DIFFRACTIVE ELEMENT FOR FOCUSING AND TRACKING PLURALITY OF LIGHT TYPES

REFERENCE TO RELATED APPLICATIONS

This application is a national stage application under 35 USC 371 of International Application No. PCT/JP2011/061226, filed May 16, 2011, which claims priority from Japanese Patent Application Nos. 2010-112688 filed May 14, 2010, 2011-093201, filed Apr. 19, 2011, the entire contents of which are incorporated herein by reference.

FIELD OF THE INVENTION

The present invention relates to an optical pickup apparatus which irradiates an optical recording medium with light and receives light reflected by the optical recording medium in order to read information recorded on the optical recording medium.

BACKGROUND OF THE INVENTION

FIG. 9 is a diagram illustrating a configuration of an optical pickup apparatus 110 according to a first related art. FIG. 10 is a top plan view of a first hologram element 111 as a diffraction element, a second hologram element 112 as a diffraction element, and a light-receiving element 113 according to the first related art. FIGS. 11A and 11B are diagrams illustrating relationships between the first and second hologram elements 111 and 112 and the light-receiving region, at which the light diffracted therethrough arrives, according to the first related art. FIG. 11A illustrates a situation in a case of using light with a first wavelength, and FIG. 11B illustrates a situation in a case of using light with a second wavelength.

The optical pickup apparatus 110 according to the first related art includes: a light source 116 that has a light emitting origin 114 for light with the first wavelength and a light emitting origin 115 for light with the second wavelength; the first hologram element 111; the second hologram element 112; and the light-receiving element 113. The first hologram element 111 diffracts a light beam, which is light emitted by the first light emitting origin 114, and a light beam which is light emitted by the light emitting origin 115 for light with the second wavelength. The second hologram element 112 diffracts the light beam (indicated by the chain double-dashed line) emitted by the light emitting origin 115 for light with the second wavelength so as to guide the beam into the light-receiving element 113, and transmits the light beam (indicated by the solid line) emitted by the light emitting origin 114 for light with the first wavelength. The first wavelength is shorter than the second wavelength, and the diffraction efficiency of the diffraction region for light with the first wavelength is lower than the diffraction efficiency of the diffraction region for light with the second wavelength (for example, refer to Patent Literature 1).

FIG. 12 is a diagram illustrating a configuration of an optical pickup apparatus 120 according to a second related art. FIG. 13 is a top plan view illustrating a diffraction element 121 and a light-receiving element 122 of the optical pickup apparatus 120 according to the second related art. FIGS. 14A and 14B are top plan views illustrating a state where light is received using the diffraction element 121 and the light-receiving element 122 according to the second related art.

The emission wavelength of a light emitting origin 123 for light with the first wavelength is a wavelength which is shorter than the emission wavelength of a light emitting origin 124 for light with the second wavelength. The diffraction angle of the light beam (indicated by the solid line), which is emitted by the light emitting origin 123 for light with the first wavelength and is diffracted by the diffraction element 121, is smaller than the diffraction angle of the light beam (indicated by the chain double-dashed line) which is emitted by the light emitting origin 124 for light with the second wavelength. Due to the difference between the diffraction angles, light-receiving regions 125 to be described later are formed in the light-receiving element 122 so as to be arranged in three columns.

The light beam, which is emitted by the light emitting origin 123 for light with the first wavelength, is incident to a light-receiving region 125a of the column corresponding to a small diffraction angle and a light-receiving region 125b of the center column, among the light-receiving regions 125 of the three columns. At this time, the focus error signal is detected by a knife edge method using an output from a predetermined part of the light-receiving region of the light-receiving region 125b of the center column.

The light beam, which is emitted by the light emitting origin 124 for light with the second wavelength, is incident to a light-receiving region 125c of the column corresponding to a large diffraction angle and the light-receiving region 125b of the center column, among the light-receiving regions 125 of the three columns. At this time, similarly to a case of using the light emitting origin 123 for light with the first wavelength, the focus error signal is detected by a knife edge method using an output from a predetermined part of the light-receiving region of the light-receiving region 125b of the center column (for example, refer to Patent Literature 2).

Regarding the light which is originated from the light emitting origin 123 for light with the first wavelength and is reflected by a recording medium and the light which is originated from the light emitting origin 124 for light with the second wavelength and is reflected by the recording medium, the positions of the light beams incident to the diffraction element 121 do not completely coincide with each other. Further, it is difficult to adjust the postures of the light emitting origins 123 and 124 for the light with the first and second wavelengths with respect to the diffraction element 121 to the same positions even in any optical pickup apparatus.

Patent Literature 1: Japanese Unexamined Patent Publication JP-A 2002-92933

Patent Literature 2: Japanese Unexamined Patent Publication JP-A 2007-287278

SUMMARY OF THE INVENTION

In the first related art, a plurality of diffraction elements are necessary, and thus there is a problem in that the configuration of the apparatus is complex. Further, since it is necessary to position both diffraction elements, there are problems in that the positional adjustment of components is complex and adjustment time is necessary. Furthermore, since the number of components is large and the costs thereof are large, there is a problem in that it is difficult to decrease the size thereof.

In the second related art, due to the difference between positions of the light emitting origins 123 and 124 for the light with the first and second wavelengths, or due to the difference between the postures of the light emitting origins 123 and 124 for the light with the first and second wavelengths with respect to the diffraction element 121, when the position of the light beam incident to the diffraction element 121 is altered with respect to the diffraction element 121, the light intensity of the light incident to the light-receiving surface of the light-receiving element 125 is altered, and thus there is a problem in that it is difficult to obtain a stable servo signal.

It is an object of the invention to provide an optical pickup apparatus capable of easily adjusting positions of a diffraction element and a light source by simplifying a configuration of the apparatus and capable of stably obtaining a servo signal.

The invention provides an optical pickup apparatus including:

a light source capable of emitting a plurality of types of light having different wavelengths, an optical recording medium being irradiated with the plurality of types of light;

a light-receiving element having a plurality of light-receiving regions, some of the plurality of light-receiving regions being used as focus light-receiving regions for a focus servo; and a diffraction element having a focus diffraction region for diffracting at least a part of light which is emitted by the light source and reflected by the optical recording medium, toward the focus light-receiving regions, the focus diffraction region including focus regions of which a number of types is equal to a number of the plurality of types of light that can be emitted by the light source, the types of the focus regions corresponding to the plurality of types of light, the respective focus regions diffracting the corresponding types of light toward the focus light-receiving regions, and the focus regions including a plurality of focus segmented regions which are distributed in a periodic manner, at least some of the focus segmented regions being disposed to be adjacent to focus segmented regions for different types of light.

According to the invention, the light source in the optical pickup apparatus is capable of emitting a plurality of types of light having different wavelengths. The diffraction element has the focus diffraction region. The focus diffraction region diffracts at least a part of light which is emitted by the light source and reflected by the optical recording medium, toward the focus light-receiving regions of the light-receiving element. The focus diffraction region has focus regions of which the number of types is equal to the number of the plurality of types of light that can be emitted by the light source. The types of the focus regions correspond to the plurality of types of the light, and the respective focus regions diffract the corresponding type of light toward the focus light-receiving regions. Further, in the focus region of each type, the plurality of focus segmented regions are disposed to be equally distributed.

Thereby, it is possible to share the focus light-receiving region for the uses of the plurality of types of light having different wavelengths. Since the plurality of focus segmented regions of the focus region of each type are disposed to be equally distributed in the focus diffraction region, it is possible to prevent a strong part or a weak part of light intensity of the light beams from being unevenly incident to a certain focus region of the plurality of types of the focus regions.

Further, even when the incidence position of the light beam incident to the diffraction element is shifted on the diffraction element, it is possible to prevent the intensity of the light incident to the focus region of each type from being altered by the positional shift. Accordingly, even when the incidence position of the light beam incident to the diffraction element is shifted, it is possible to stably perform the focus servo. Thereby, it is not necessary to provide a plurality of diffraction elements, and thus it is possible to simplify the configuration of the apparatus. Further, since the difference in position of the light source with respect to the diffraction element has no great effect on the light intensity of the light incident to the focus region of each type, it is possible to easily adjust the positions of the components.

Further, in the invention, it is preferable that a predetermined part of an outer periphery of the focus diffraction region is defined by a knife edge portion which is linear, and the knife edge portion intersects with an incident region, which light reflected by the optical recording medium enters, in the diffraction element regardless of type of the reflected light, the focus diffraction region is divided into a plurality of focus segmented regions by a plurality of parallel dividing lines arranged in parallel with one another, and the plurality of parallel dividing lines are perpendicular or oblique to the knife edge portion.

According to the invention, the predetermined part of the outer periphery of the focus diffraction region is defined by the knife edge portion which is linear. The knife edge portion intersects with the incident region, which light reflected by the optical recording medium enters, in the diffraction element regardless of type of the reflected light. The focus diffraction region is divided into the plurality of focus segmented regions by the plurality of parallel dividing lines arranged in parallel with one another. The plurality of parallel dividing lines are oblique to the knife edge portion.

Thereby, the focus segmented region in the vicinity of the knife edge portion is formed in a tapered shape. Accordingly, when the diameter of the light beam incident to the diffraction element is altered, it is possible to prevent a part of the focus segmented region, which is included in a range of incidence of the light beam, and a part of the focus segmented region, which is not included in the range of incidence of the light beam, from being biased to some types of the plurality of types of focus regions. Thereby, even when the diameter of the light beam incident to the diffraction element is altered, by preventing the light intensity of the light incident to the focus region of each type from being rapidly altered, it is possible to achieve a smooth change. Accordingly, it is possible to stably perform the focus servo.

Further, in the invention, it is preferable that the parallel dividing lines are formed at an angle greater than or equal to 30 degrees and less than or equal to 150 degrees with respect to the knife edge portion.

According to the invention, the parallel dividing lines are formed at an angle greater than or equal to 30 degrees and less than or equal to 150 degrees with respect to the knife edge portion. Thereby, when the diameter of the light beam incident to the diffraction element is altered, it is possible to effectively distribute an area of the part of the focus segmented region, which is included in the range of incidence of the light beam, and an area of the part of the focus segmented region, which is not included in the range of incidence of the light beam, in the plurality of types of focus regions. Accordingly, it is possible to stably perform the focus servo.

Further, in the invention, it is preferable that, in the respective focus segmented regions, a plurality of diffraction grooves are formed to be arranged in parallel and in a periodic manner, and the diffraction grooves, of which a number is five or more, intersect with the respective focus segmented regions on an imaginary plane which is orthogonal to the diffraction grooves of the respective focus segmented regions.

According to the invention, in each focus segmented region, the plurality of diffraction grooves are formed to be arranged in parallel and in a periodic manner. The diffraction grooves, of which the number is five or more, intersect with the respective focus segmented regions on an imaginary plane which is orthogonal to the diffraction grooves of the respective focus segmented regions. Thereby, it is possible to make the number of diffraction grooves of the respective focus segmented regions, arranged in the direction perpendicular to the diffraction grooves, greater than or equal to the minimum required number in order to effectively perform diffraction. Accordingly, it is possible to effectively perform diffraction in the respective focus segmented regions.

Further, in the invention, it is preferable that the plurality of light-receiving regions have tracking light-receiving regions used in tracking servo for tracks of the optical recording medium, the diffraction element has a tracking diffraction region for diffracting at least a part of the reflected light toward the tracking light-receiving regions, the tracking diffraction region has tracking regions of which a number of types is equal to the number of types of light that can be emitted by the light source, the respective types of the tracking regions correspond to the types of light, the respective tracking regions diffract corresponding types of light toward same positions or vicinities of the tracking light-receiving regions, and the respective types of tracking regions include a plurality of tracking segmented regions, and the plurality of tracking segmented regions of the respective types of tracking regions are distributed in a periodic manner in a direction corresponding to a direction of tangent to the track in the tracking diffraction region, and at least some of the regions are disposed to be adjacent to the tracking segmented regions for different types of light.

According to the invention, some of the plurality of light-receiving regions have tracking light-receiving regions, and the tracking light-receiving regions are used in tracking servo for tracks of the optical recording medium. The diffraction element has the tracking diffraction region, and the tracking diffraction region diffracts at least a part of the reflected light toward the tracking light-receiving regions. The tracking diffraction region has tracking regions of which the number of types is equal to the number of types of light that can be emitted by the light source. The respective types of the tracking regions correspond to the types of light. The respective tracking regions diffract the corresponding types of light toward the tracking light-receiving regions, and include a plurality of tracking segmented regions. The plurality of tracking segmented regions of the respective types of tracking region are equally distributed in the direction corresponding to the direction of tangent to the track in the tracking diffraction region.

Thereby, it is possible to share the tracking light-receiving region for the uses of the plurality of types of light having different wavelengths. Further, even when the incidence position of the light beam incident to the diffraction element is altered in the direction corresponding to the direction of tangent to the track on the diffraction element, it is possible to make the light beams incident to the plurality of types of tracking regions. Accordingly, even in a case of using the light of any of the plurality of types, it is possible to perform the tracking servo. Further, by defining the tracking light-receiving region at the position where a plurality of types of light diffracted by the plurality of types of tracking regions enter, it is possible to reduce the tracking light-receiving region. Accordingly, it is possible to miniaturize the light-receiving element. Further, by reducing the size of tracking light-receiving region, it is possible to increase the response speed of the tracking servo.

Further, in the invention, it is preferable that the tracking light-receiving region has a first tracking light-receiving region and a second tracking light-receiving region used in the tracking servo, the respective tracking segmented regions have a first-type diffraction region for diffracting a part of the reflected light toward the first tracking light-receiving region and a second-type diffraction region for diffracting a part of the reflected light toward the second tracking light-receiving region, a plurality of dividing lines for dividing the plurality of tracking segmented regions included in the respective types of tracking regions into the first-type diffraction region and the second-type diffraction region, are disposed in straight lines extending in a direction corresponding to a direction of tangent to the track in the tracking diffraction region, and positions of the respective straight lines in the types of tracking regions depend on a position of the light source, which emits a type of light corresponding to each of the tracking regions, in a radial direction perpendicular to the direction of tangent to the track.

According to the invention, the tracking light-receiving region has the first tracking light-receiving region and the second tracking light-receiving region. The first and second tracking light-receiving regions are used in the tracking servo. The respective tracking segmented regions have the first-type diffraction region and the second-type diffraction region. The first-type diffraction region diffracts a part of the reflected light toward the first tracking light-receiving region. The second-type diffraction region diffracts a part of the reflected light toward the second tracking light-receiving region.

The plurality of dividing lines for dividing the plurality of tracking segmented regions included in the respective types of tracking regions into the first-type diffraction region and the second-type diffraction region, are disposed in straight lines extending in the direction corresponding to the direction of tangent to the track in the tracking diffraction region. The positions of the respective straight lines in the types of tracking regions depend on a position of the light source, which emits the type of light corresponding to each of the tracking regions, in the radial direction. The radial direction is a direction perpendicular to the direction of tangent to the track and the direction of the thickness of the diffraction element.

Thereby, even when there are differences between the positions of the plurality of light sources, it is possible to prevent the light intensity of the light incident to the first and second tracking light-receiving regions from being biased to either one of the first and second tracking light-receiving regions. Accordingly, it is possible to perform the tracking servo with high accuracy.

Further, in the invention, it is preferable that the tracking light-receiving region selectively receives light, which is diffracted by one type of tracking regions among the plurality of types of tracking regions, in accordance with the types of the reflected light.

According to the invention, the tracking light-receiving region selectively receives light, which is diffracted by one type of tracking regions among the plurality of types of tracking regions, in accordance with the types of the reflected light.

Thereby, it is possible to miniaturize the tracking light-receiving region. Accordingly, it is possible to increase the response speed of the tracking servo.

BRIEF DESCRIPTION OF THE DRAWINGS

FIG. 7 is a top plan view illustrating the diffraction element and the light-receiving element according to the second embodiment of the invention;

FIG. 8A is a diagram illustrating a relationship between the diffraction element according to the second embodiment of the invention and each light-receiving region at which the light diffracted therethrough arrives;

FIG. 8B is a diagram illustrating a relationship between the diffraction element according to the second embodiment of the invention and each light-receiving region at which the light diffracted therethrough arrives;

DETAILED DESCRIPTION OF THE INVENTION

Now refereeing to the drawings, a plurality of embodiments for implementing the technology will be described below. In the following description, constituent components of an embodiment corresponding to those that have been already described in the preceding embodiment will be identified with the same reference symbols, and overlapping explanation may be omitted. Where only a certain part of the construction of an embodiment is described, the rest part thereof will be deemed to be the same as that of the preceding embodiment. Not only it is possible to adopt a combination of specifically-described features of different embodiments, but it is also possible to combine different embodiments in part insofar as the combination poses no problem. Moreover, the following embodiments are considered as illustrative only of the technical features of the technology and are not intended to limit the technical scope of the technology. Hence, many changes and modifications may be made within the technical scope of the technology as expressed in the appended claims.

Figure 1:
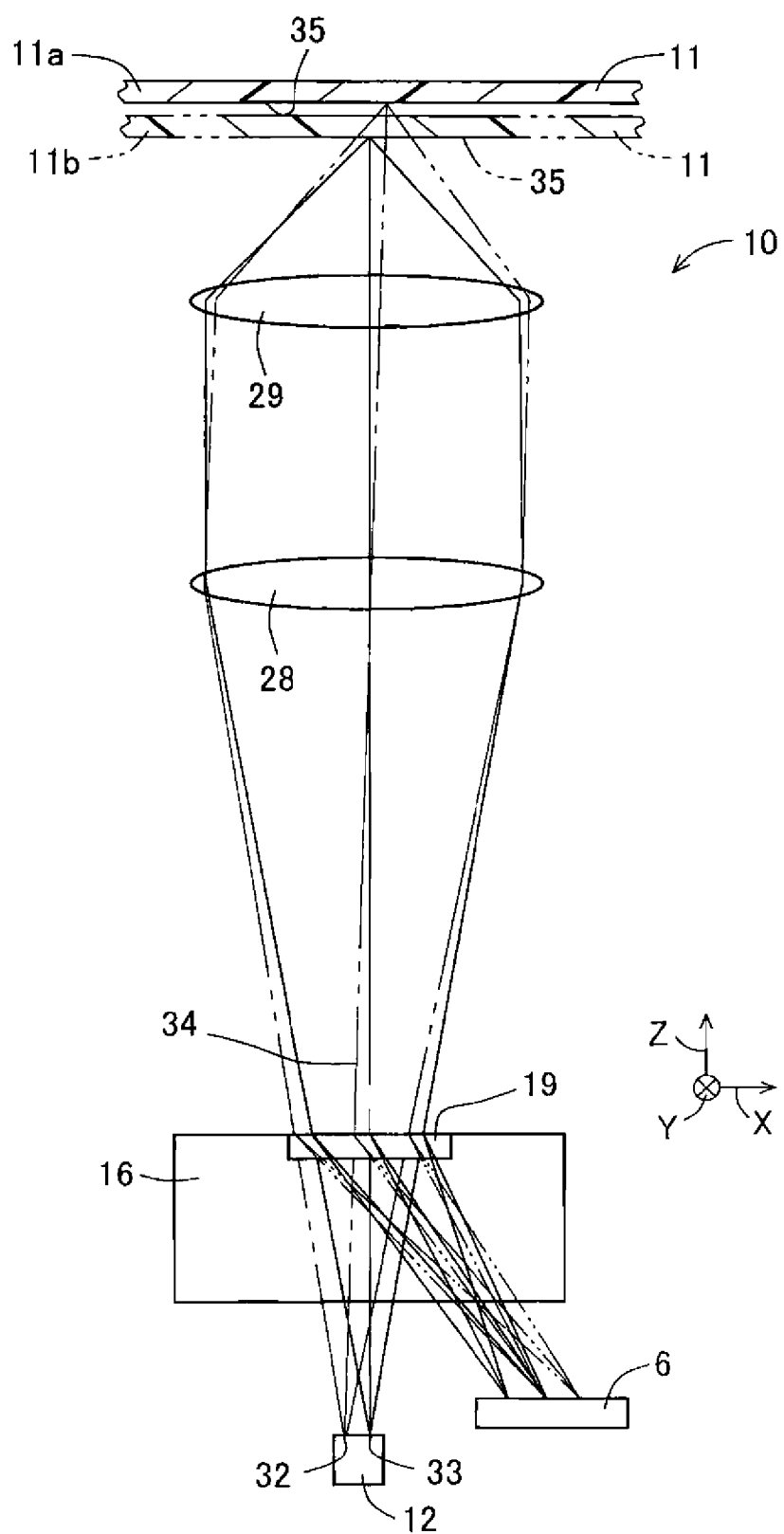
FIG. 1 is a diagram illustrating a configuration of an optical pickup apparatus according to a first embodiment of the invention.
Figure 2:
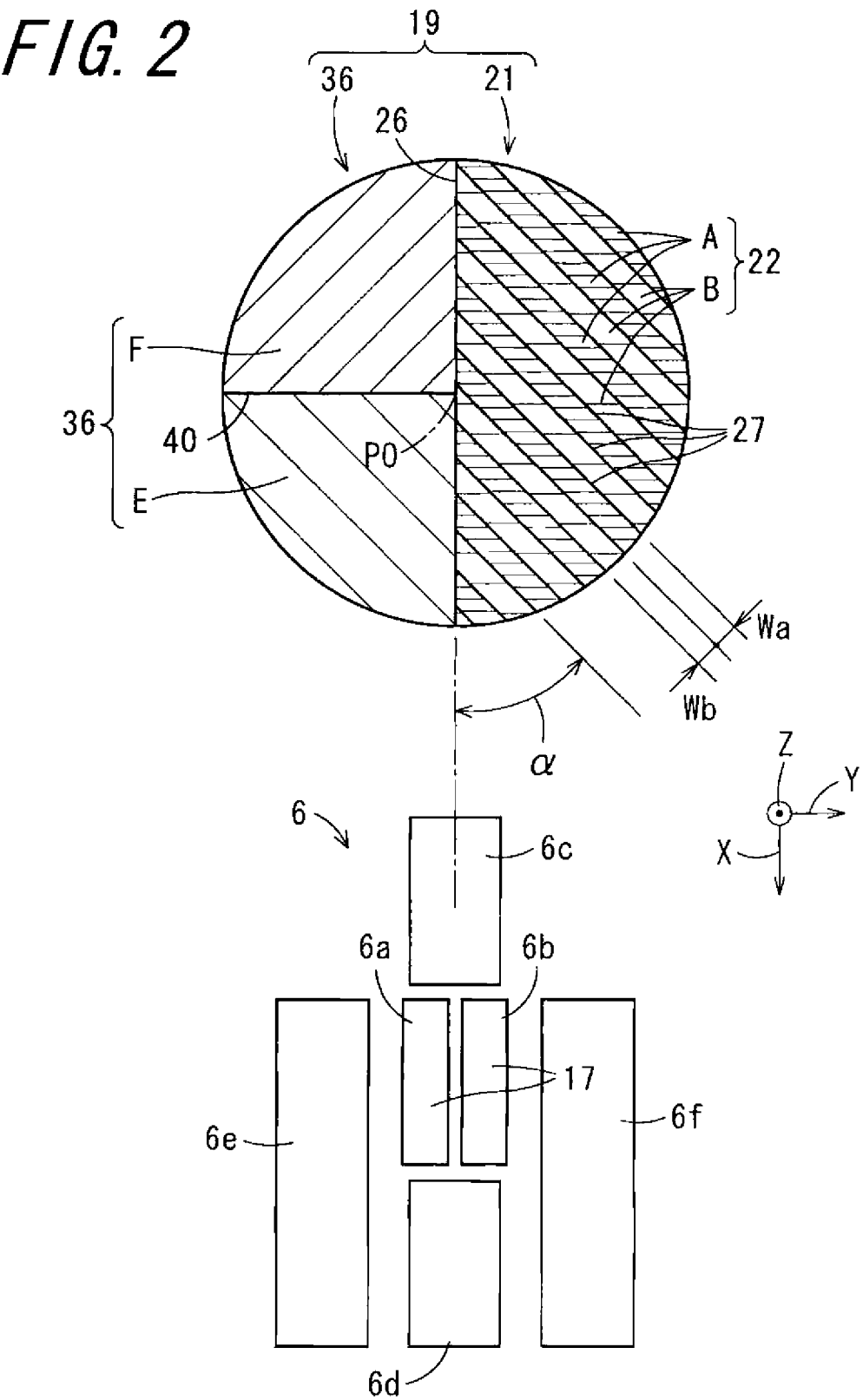
FIG. 2 is a top plan view illustrating a diffraction element and a light-receiving element according to the first embodiment of the invention.
Figure 2A:
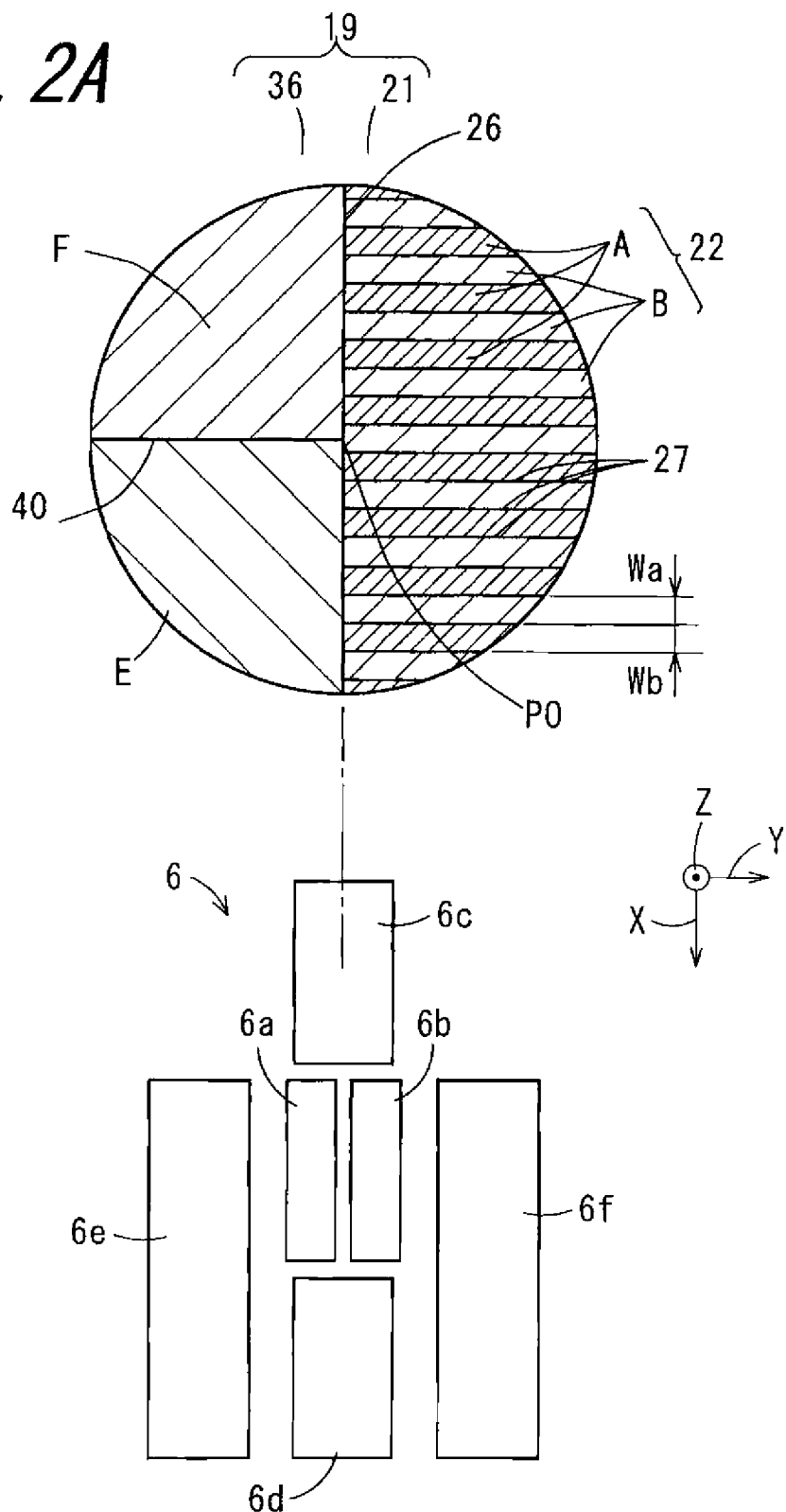
FIG. 2A is a top plan view illustrating an arrangement of the light-receiving element and the diffraction element in which parallel dividing lines are perpendicular to the knife edge portion, as viewed from an optical axis direction.

FIG. 1 is a diagram illustrating a configuration of an optical pickup apparatus 10 according to a first embodiment of the invention. FIGS. 2 and 2A are top plan views illustrating arrangement of a diffraction element 16 and a light-receiving element 6 according to the first embodiment of the invention, as viewed from an optical axis direction. In both drawings, a diffraction region 19 is divided into a focus diffraction region 21 and a tracking diffraction region 36 by a plurality of dividing lines, and the dividing line, which is one of the plurality of dividing lines and is disposed to extend in a radial direction X through a center point P0 of the diffraction region 19, will be described later as a "knife edge portion" (26). FIG. 2A is a top plan view illustrating the arrangement of the light-receiving element 6 and the diffraction element 16 in which parallel dividing lines 27 are perpendicular to the knife edge portion 26, as viewed from the optical axis direction. FIG. 3 is a diagram illustrating a relationship between the diffraction element 16 according to the first embodiment of the invention and each light-receiving region at which the light diffracted therethrough arrives. In order to read information which is recorded on an optical recording medium 11, the optical pickup apparatus 10 according to the first embodiment is an apparatus that irradiates the optical recording medium 11 with light and receives reflected light 18 from the optical recording medium.

In the first embodiment, the optical pickup apparatus 10 includes a light source 12, the light-receiving element 6, and the diffraction element 16. The light source 12 is capable of emitting a plurality of types of light having different wavelengths and emits light, an optical recording medium 11 being irradiated with the plurality of types of light. The light-receiving element 6 has a plurality of light-receiving regions. Some of the plurality of light-receiving regions are used as a focus light-receiving region 17. The focus light-receiving region 17 is used for a focus servo.

The light 18 reflected by the optical recording medium 11 is incident to the diffraction element 16. The diffraction element 16 has a diffraction region 19 divided into a plurality of regions. Some of the regions are used as the focus diffraction regions 21 for diffracting the reflected light 18 toward the light-receiving element 6. The focus diffraction region 21 diffracts at least a part of the reflected light 18 toward the focus light-receiving regions 17. The focus diffraction region 21 has a focus region 22 of which the number of types is equal to the number of the respective types of light that can be emitted by the light source 12. The types of the focus regions 22 corresponds to the respective types of light, and the respective focus regions 22 diffract the corresponding types of light toward the focus light-receiving regions 17. Further, the respective types of focus regions 22 include a plurality of focus segmented regions. The plurality of focus segmented regions, into which each of the types of focus regions 22 is divided, are disposed to be distributed in the focus diffraction region 21.

The predetermined part of the outer periphery of the focus diffraction region 21 is defined by the knife edge portion 26 which is set as a focus definition dividing line formed to be linear. The knife edge portion 26 intersects with the incident region, which light 18 reflected by the optical recording medium enters, in the diffraction element 16 regardless of type of the reflected light 18. The focus diffraction region 21 is divided into the plurality of focus segmented regions by the plurality of parallel dividing lines 27 arranged in parallel with one another. The plurality of parallel dividing lines 27 have a predetermined angle to the knife edge portion 26.

An angle which the parallel dividing line 27 forms with the knife edge portion 26 falls in a range of 30 degrees or more and 150 degrees or less. In the respective focus segmented regions, a plurality of diffraction grooves are arranged in parallel and in a periodic manner. In each focus segmented region, five or more diffraction grooves intersect with an imaginary plane intersecting perpendicularly with the diffraction grooves.

The optical recording medium 11 capable of recording or reproducing information includes a compact disk (abbreviated as "CD"), a digital versatile disk (abbreviated as "DVD") and a blu-ray disk (abbreviated as "BD": registered trademark), and the like. In the first embodiment, it is preferable to use any two types of them. The CD uses light having an infrared range wavelength in the vicinity of 780 nm, in recording and reproducing information. The DVD uses light having a red wavelength in the vicinity of 650 nm, in recording and reproducing information. The BD uses light having a violet-blue wavelength in the vicinity of 405 nm, in recording and reproducing information. The optical recording medium 11 may be a high-capacity medium in which a plurality of recording layers are laminated. In order to perform at least one of recording and reproducing of the plurality of optical recording media 11, a single optical pickup apparatus 10 is provided with the light source 12 that emits light with two or three wavelengths. FIG. 1 illustrates a case of using one type 11a of the optical recording media 11 and a case of using one type 11b of which the used wavelength is different from that of the optical recording medium 11a.

Recording and reproduction of the information with respect to the optical recording medium 11 is performed by irradiating a data recorded surface of the medium with laser light and receiving the reflected light in the light-receiving region on the light-receiving element 6.

In order to perform the focus servo and tracking servo with respect to the optical recording medium 11, an optical signal of the light, which is received by the light-receiving region on the light-receiving element 6, is converted into an electric signal, and a servo signal is detected. The focus servo and tracking servo are performed on the basis of the detection result of a servo signal. In the focus servo, a knife edge method, an astigmatism method, and the like are used. Further, in the radial servo control, a DPD method (differential phase detection), a differential push-pull method (abbreviated as "DPP"), or the like is selectively used in accordance with the type of the optical recording medium 11.

In the first embodiment, the optical pickup apparatus 10 further includes a collimator lens 28 that collimates the light emitted by the light source 12; and an objective lens 29 that concentrates the light beams collimated by the collimator lens 28 on the optical recording medium 11. The objective lens 29 is supported by an actuator (not shown). The light source 12 is embodied by a semiconductor laser element, and has two light emitting origins of a first light emitting origin 32 that emits the light with the first wavelength and a second light emitting origin 33 that emits the light with the second wavelength. The light with the first wavelength from the first light emitting origin 32 and the light with the second wavelength from the second light emitting origin 33 are emitted in substantially the same direction. Among the two wavelengths different from each other, the shorter wavelength is set as a first wavelength, and the longer wavelength is set as a second wavelength.

The semiconductor laser element is a monolithic type having the light emitting origins, which have different wavelengths, in a single chip, but the invention is not limited to this, and the element may be a hybrid type in which single-chip single-wavelength laser light beams are disposed to be close to each other.

In FIG. 1, the optical axes of a plurality of optical components, which guide light 34 emitted by the light source 12 into the optical recording medium 11, are disposed in a single straight line. Hereinafter, the optical axis direction of the light 34 emitted by the first light emitting origin 32 is set as an "optical axis direction" (Z), and is disposed to pass through the centers of the collimator lens 28 and the objective lens 29. FIG. 3 illustrates the diffraction element 16 and the light-receiving element 6 as viewed from the optical axis direction Z.

The concentrated light spot, at which the light 34 emitted by the light source 12 is concentrated on a recording surface 35 of the optical recording medium 11, is positioned on the track formed on the recording surface 35. The direction of tangent to the track at the concentrated light spot thereof is set as a "tangential direction" (Y). Further, the direction in the diffraction element 16 and the light-receiving element 6 corresponding to the direction of tangent to the track at the concentrated light spot thereof is also similarly described as the "tangential direction" (Y). Furthermore, the direction, which is perpendicular to the optical axis direction Z and perpendicular to the tangential direction Y, is set as a "radial direction" (X).

The light-receiving element 6 is spaced from the light source 12 in the radial direction X. When the radial direction X is defined by two opposite radial directions, one radial direction X from the light-receiving element 6 toward the light source 12 will be termed "negative direction" (hereafter referred to as "− direction"), and the other radial direction X opposite to −X direction will be termed "positive direction" (hereafter referred to as "+ direction").

The light-receiving element 6 has six light-receiving regions of the first to sixth light-receiving regions 6a to 6f. Among them, the first light-receiving region 6a and the second light-receiving region 6b are disposed to be adjacent to each other in the tangential direction Y, and the optical signal of the light, which is concentrated and incident to the first and second light-receiving regions 6a and 6b, is used in the focus servo. In the − direction of the radial direction X from the first and second light-receiving regions 6a and 6b, the third light-receiving region 6c is disposed, and in the + direction of the radial direction X from the first and second light-receiving regions 6a and 6b, the fourth light-receiving region 6d is disposed. The third light-receiving region 6c and the fourth light-receiving region 6d are respectively disposed on positions the same as those of the first and second light-receiving regions 6a and 6b in the tangential direction Y.

The fifth light-receiving region 6e and the sixth light-receiving region 6f are disposed in the + and − directions of the tangential direction Y from the first to fourth light-receiving regions 6a to 6d. The positions of the fifth light-receiving region 6e and the sixth light-receiving region 6f in the radial direction X are disposed on positions the same as those of the first, second, and fourth light-receiving regions 6a, 6b, and 6d in the radial direction X.

The sizes of the first light-receiving region 6a and the second light-receiving region 6b in the radial direction X are set to be equal to each other. The sizes of the third and fourth light-receiving regions 6c and 6d in the radial direction X are set to be substantially equal to the sizes of the first and second light-receiving regions 6a and 6b in the radial direction X. Alternatively, the size of the third light-receiving region 6c in the radial direction X is set to be shorter than the sizes of the first and second light-receiving regions 6a and 6b in the radial direction X, and the size of the fourth light-receiving region 6d in the radial direction X is set to be longer than the sizes of the first and second light-receiving regions 6a and 6b in the radial direction X. Each size of the fifth and sixth light-receiving regions 6e and 6f in radial direction X is set to be substantially equal to the sum of the size of the first or second light-receiving regions 6a and 6b in the radial direction X and the size of the fourth light-receiving region 6d in the radial direction X.

The respective sizes of the third to sixth light-receiving regions 6c to 6f in the tangential direction Y are set to be substantially equal to each other. As compared with the size thereof, the sizes of the first light-receiving region 6a and second light-receiving region 6b in the tangential direction Y are set to a half of the size thereof. An imaginary straight line, which passes through the centers of the third and fourth light-receiving regions 6c and 6d in the tangential direction Y and extends in the radial direction X, passes through the center between the first light-receiving region 6a and the second light-receiving region 6b.

The positions of the ends of the first, second, fifth and sixth light-receiving regions 6a, 6b, 6e, and 6f in the − direction of the radial direction X substantially coincide with a single straight line which extends in the tangential direction Y. The positions of the fourth, fifth, and sixth light-receiving regions 6d, 6e, and 6f in the + direction of the radial direction X coincide with another single straight line which extends in the tangential direction Y. The four light-receiving regions of the first, second, fifth and sixth light-receiving regions 6a, 6b, 6e, and 6f receive both light beams with the first wavelength and the second wavelength. The third light-receiving region 6c receives the light with the first wavelength, and the fourth light-receiving region 6d receives the light with the second wavelength.

The diffraction region 19, which is formed on the diffraction element 16, diffracts + first-order diffraction light of the light 18 reflected by the optical recording medium 11 toward the light-receiving regions 6a to 6f for detecting the respective signals. Diffraction grooves are formed in a diffraction grating constituting the diffraction region 19. When the diffraction region 19 is viewed from the optical axis direction Z, the diffraction region 19 has a circular shape, and the center point P0 is disposed at a position where the optical axis 34 of the optical pickup apparatus 10 passes therethrough.

The diffraction region 19 is divided into the focus diffraction region 21 and the tracking diffraction region 36 by the plurality of dividing lines. One of the plurality of dividing lines is disposed to pass through the center point P0 of the diffraction region 19 and extend in the radial direction X. The dividing line is referred to as the "knife edge portion" (26). In the diffraction region 19, the region in the + direction of the tangential direction Y from the knife edge portion 26 is the focus diffraction region 21, and the region in the − direction of the tangential direction Y is the tracking diffraction region 36. The focus diffraction region 21 and the tracking diffraction region 36 may be arranged such that the positions thereof are reversed with respect to the knife edge portion 26 as the axis of symmetry.

The focus diffraction region 21 and the tracking diffraction region 36 are respectively formed in semicircular shapes. The tracking diffraction region 36 is further divided into a first tracking region E and a second tracking region F. The dividing line, which divides the tracking diffraction region 36 into the first tracking region E and the second tracking region F, is disposed to pass through the center point P0 and extend in the tangential direction Y. Thereby, each of the first tracking region E and the second tracking region F has a fan shape which is defined by a circumference two radial lines orthogonal to each other.

The focus diffraction region 21 is further divided into a plurality of focus regions 22 in accordance with the number of types of light. In the first embodiment, the focus diffraction region 21 includes: a first focus region A that includes a plurality of focus segmented regions surrounded by both or either one of the knife edge portion 26 and the circular arc defining the outer circumference and the parallel dividing lines 27 with a width Wa divided into a plurality of subdivided regions having long and thin shapes by the plurality of parallel dividing lines 27, which are inclined at an angle α to the knife edge portion 26, are parallel with each other, and are alternately separated by the width Wa and a width Wb from each other, in the semicircle of the focus diffraction region 21; and a second focus region B that includes a plurality of remaining focus segmented regions with the width Wb other than them. The focus segmented regions forming the first focus region A and the focus segmented regions forming the second focus region B are disposed alternately one by one so as to be adjacent to each other in the direction perpendicular to the parallel dividing lines 27.

Thereby, the focus segmented regions forming the first focus region A and the focus segmented regions forming the second focus region B are disposed to be distributed in a periodic manner in the focus diffraction region 21. Accordingly, each focus segmented region in the first focus region A and the second focus region B is defined by one or two parallel dividing lines 27, the knife edge portion 26, and a part of the circular arc defining the outer circumference of the diffraction region 19.

The first focus region A has a diffraction grating by which the incident light with the first wavelength is concentrated in the boundary line between the first and second light-receiving regions 6a and 6b of the light-receiving element 6. The second focus region B has a diffraction grating by which the incident light with the second wavelength is concentrated in the boundary line between the first and second light-receiving regions 6a and 6b of the light-receiving element 6, is formed.

The first wavelength is represented as "λ1", and the second wavelength is represented as "λ2". The angle of incidence of light of the first wavelength on the first focus region A is represented as "θA1i", and the diffraction angle of + first-order diffracted light resulting from diffraction of the incident light is represented as "θA1d". The angle of incidence of light of the second wavelength on the first focus region A is represented as "θA2i", and the diffraction angle of + first-order diffracted light resulting from diffraction of the incident light is represented as "θA2d". The angle of incidence of light of the first wavelength on the second focus region B is represented as "θB1i", and the diffraction angle of + first-order diffracted light resulting from diffraction of the incident light is represented as "θB1d". The angle of incidence of light of the second wavelength on the second focus region B is represented as "θB2$i$", and the diffraction angle of + first-order diffracted light resulting from diffraction of the incident light is represented as "θB2$d$".

Assuming that a pitch between the diffraction grooves of the first focus region A is "dA" and a pitch between the diffraction grooves of the second focus region B is "dB", the following Expressions (1) to (4) are established.

Region $A$+Wavelength λ1: sin θ$A$1$i$−sin θ$A$1$d$=λ1/$dA$     (1)

Region $B$+Wavelength λ1: sin θ$B$1$i$−sin θ$B$1$d$=λ1/$dB$     (2)

Region $A$+Wavelength λ2: sin θ$A$2$i$−sin θ$A$2$d$=λ2/$dA$     (3)

Region $B$+Wavelength λ2: sin θ$B$2$i$−sin θ$B$2$d$=λ2/$dB$     (4)

Figure 3A:
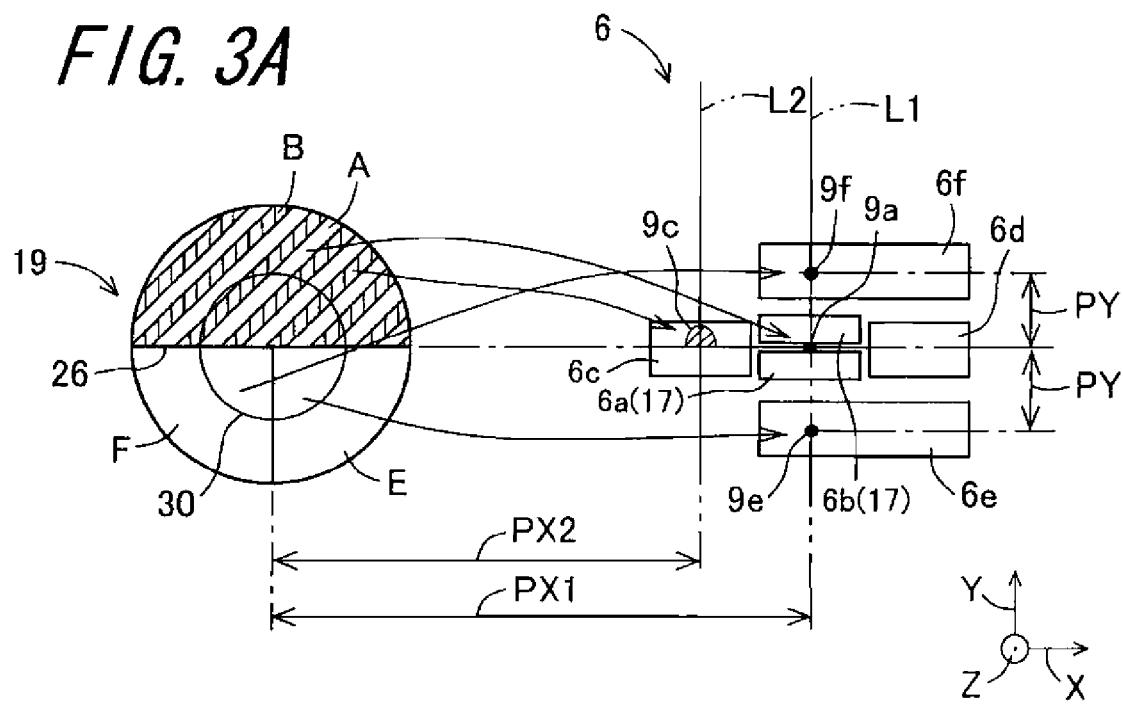
FIG. 3A is a diagram illustrating a relationship between the diffraction element according to the first embodiment of the invention and each light-receiving region at which the light diffracted therethrough arrives.

As shown in FIG. 3A, when the light with the first wavelength is incident to the first focus region A of the diffraction region 19, the light diffracted in the first focus region A is concentrated as a concentrated light spot 9$a$ at the position separated by a distance "PX1" from the optical axis 34 of the light emitted by the first light emitting origin 32 of the light source 12 toward the + direction of the radial direction X. The straight line, which passes through the light concentration position of the concentrated light spot 9$a$ separated by the distance "PX1" from the optical axis 34 of the light emitted by the first light emitting origin 32 of the light source 12 toward the + direction of the radial direction X and extends in the tangential direction Y, on the light-receiving surface of the light-receiving element 6 is set as a first straight line L1.

The concentrated light spot 9$a$ on the light-receiving surface of the light-receiving element 6 has a shape of the point in the boundary line between the first light-receiving region 6$a$ and the second light-receiving region 6$b$ or a shape similar thereto. The first straight line L1 on the light-receiving surface of the light-receiving element 6 passes through the first, second, fifth and sixth light-receiving regions 6$a$, 6$b$, 6$e$, and 6$f$. The diffraction light with the first wavelength, which is incident to the first tracking region E of the diffraction region 19, is concentrated in a point shape as a concentrated light spot 9$e$ in the fifth light-receiving region 6$e$ at the distance PY away from the concentrated light spot 9$a$ toward the − direction of the tangential direction Y in the first straight line B1, or is concentrated in a shape similar thereto. The diffraction light with the first wavelength incident to the second tracking region F is concentrated in a point shape as a concentrated light spot 9$f$ in the sixth light-receiving region 6$f$ at the distance PY away from the concentrated light spot 9$a$ toward the + direction of the tangential direction Y in the first straight line L1, or is concentrated in a shape similar thereto.

When the light with the first wavelength is incident to the second focus region B of the diffraction region 19, the light diffracted in the second focus region B is concentrated as a concentrated light spot 9$c$ at the position separated by a distance "PX2" from the optical axis 34 of the light emitted by the first light emitting origin 32 of the light source 12 toward the + direction of the radial direction X. The distance PX2 is shorter than the distance PX1. The straight line, which passes through the light concentration position of the concentrated light spot 9$c$ separated by the distance "PX2" from the optical axis 34 of the light emitted by the first light emitting origin 32 of the light source 12 and extends in the tangential direction Y, on the light-receiving surface of the light-receiving element 6 is set as a second straight line L2. The concentrated light spot shape of the concentrated light spot 9$c$ of the light with the first wavelength, which is diffracted in the second focus region B, in the light-receiving region 6$c$ is slightly larger than the concentrated light spot shape of the concentrated light spot 9$a$ of the light with the first wavelength, which is diffracted in the second focus region A, on the boundary between the light-receiving regions 6$a$ and 6$b$.

Figure 3B:
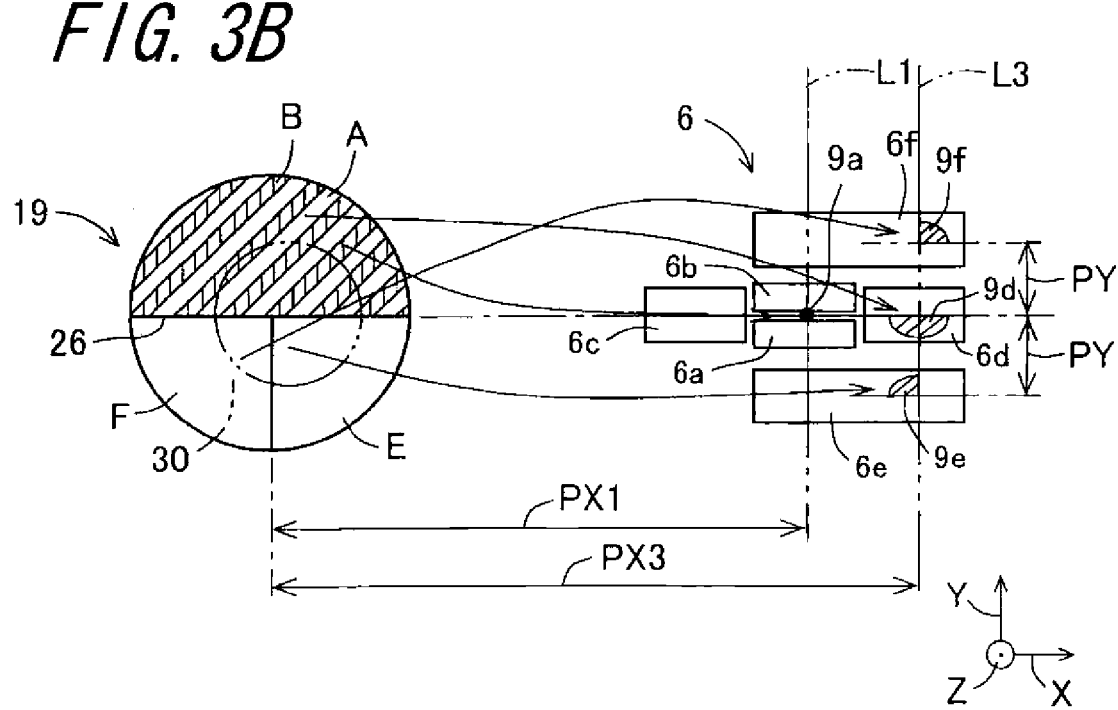
FIG. 3B is a diagram illustrating a relationship between the diffraction element according to the first embodiment of the invention and each light-receiving region at which the light diffracted therethrough arrives.

As shown in FIG. 3B, when the light with the second wavelength is incident to the second focus region B of the diffraction region 19, the light diffracted in the second focus region B is concentrated as the concentrated light spot 9$a$ at the position separated by the distance "PX1" from the optical axis 34 of the light emitted by the first light emitting origin 32 of the light source 12 toward the + direction of the radial direction X. The position thereof is the same as the position where the above-mentioned light with the first wavelength diffracted in the first focus region A is concentrated as the concentrated light spot 9$a$ at the position separated by the distance "PX1" from the optical axis 34 of the light emitted by the first light emitting origin 32 of the light source 12 toward the + direction of the radial direction X. Accordingly, a value of the diffraction angle of the light with the first wavelength at an arbitrary point in the parallel dividing line 27 in the first focus region A is set to be equal to a value of the diffraction angle of the light with the second wavelength at the same arbitrary point in the parallel dividing lines 27 in the second focus region B.

When the light with the second wavelength is incident to the first focus region A of the diffraction region 19, the light diffracted in the first focus region A is concentrated as a concentrated light spot 9$d$ at the position separated by a distance "PX3" from the optical axis 34 of the light emitted by the first light emitting origin 32 of the light source 12 toward the + direction of the radial direction X. The distance PX3 is longer than the distance PX1. The straight line, which passes through the light concentration position of the concentrated light spot 9$d$ separated by the distance "PX3" from the optical axis 34 of the light emitted by the first light emitting origin 32 of the light source 12 and extends in the tangential direction Y, on the light-receiving surface of the light-receiving element 6 is set as a third straight line L3. The third straight line L3 on the light-receiving surface of the light-receiving element 6 passes through the fourth to sixth light-receiving regions 6$d$ to 6$f$.

The light with the second wavelength, which is incident to the first tracking region E of the diffraction region 19, is concentrated into the fifth light-receiving region 6$e$ in the third straight line L3. The light with the second wavelength, which is incident to the second tracking region F, is concentrated in the sixth light-receiving region 6$f$ in the first straight line L1.

As described above, the diffraction angle of the light with the first wavelength in the first focus region A and the diffraction angle of the light with the second wavelength in the second focus region B are set to the same value. Thereby, the relationship of the diffraction angles θA1$d$ and θB2$d$ which are set to be equal to each other in Expressions (1) and (4) is established. The positions of the first light emitting origin 32 and the second light emitting origin 33 in the light source 12 are different. However, for convenience of description, assuming that the positions of the light emitting origins are the same and each angle of incidence to the diffraction element 16 is set to zero degree, λ1/$dA$=λ2/$dB$     (5)

is established. At this time, regarding the diffraction angle θB1$d$ in the case where the light with the first wavelength is incident to the region B, the following Expression (6) is established from the Expressions (2) and (5).

sin θ$B$1$d$=(λ1/λ2)·sin θ$A$1$d$     (6)

Accordingly, regarding the first wavelength and the second wavelength, the relationship of "λ1<λ2" is established. Therefore, the diffraction angles satisfy θB1d<θA1d. Accordingly, the light is diffracted toward the position of the second reference position 9c closer to the optical axis than the first reference position 9e, and as shown in FIG. 3A, reaches the position the same as the concentrated light spot 9c in the third light-receiving region 6c.

Likewise, calculating the diffraction angle θA2d in the case where the light with the second wavelength is incident to the region A, $$\sin \theta A2d = (\lambda 2/\lambda 1) \cdot \sin \theta B2d \tag{7}$$

is established, and θA2d>θB2d is established. Accordingly, the light is diffracted to be closer to the first reference position 9d separated from the optical axis than the first reference position 9a, and as shown in FIG. 3B, reaches the position the same as the concentrated light spot 9d in the fourth light-receiving region 6d.

The direction of the grooves of the diffraction gratings of the first focus region A and second focus region B of the diffraction region 19 is the tangential direction Y, or is formed in a curve shape similar thereto. The pitches of the diffraction grooves of the first focus region A and the second focus region B satisfy λ1<λ2, and satisfy the relationship of dA<dB from Expression (5). Hence, wide areas and narrow areas of the pitches in the direction perpendicular to the parallel dividing lines 27 are alternately arranged.

Further, the light with the first wavelength, which is incident to the second tracking region F of the diffraction region 19, is diffracted toward the sixth light-receiving region 6f, and is concentrated as the concentrated light spot 9f at the distance PX1 from the center point P0 in the + direction of the radial direction X, and at the distance "PY" from the center point P0 in the + direction of the tangential direction Y. Hence, the direction of the grooves of the second tracking region F is the direction orthogonal to the straight line connecting the concentrated light spot 9f and the center point P0 of FIG. 2 or is formed in a curve shape similar thereto.

Furthermore, the light with the first wavelength, which is incident to the first tracking region E, is diffracted toward the fifth light-receiving region 6e, and is concentrated as the concentrated light spot 9e at the distance PX1 from the center point P0 in the + direction of the radial direction X, and at the distance "PY" from the center point P0 in the − direction of the tangential direction Y. Hence, the direction of the grooves of the first tracking region E is the direction orthogonal to the straight line connecting the concentrated light spot 9e and the center point P0 of FIG. 2 or is formed in a curve shape similar thereto.

In a case where the light with the second wavelength is incident to the first and second tracking regions E and F, the diffraction angle satisfies the relationship of λ1<λ2 similarly to the case of the first and second focus regions A and B, and is thus set to be larger than the diffraction angle of the light with the first wavelength. Thus, the concentrated light spots 9f and 9e are formed to be separated from the concentrated light spots 9f and 9e of the light with the first wavelength toward +X direction and to be approximately at the distance PX3 from the center point P0 in the + direction of the radial direction X and at the distance PY in the − direction of the tangential direction Y.

The diffraction region 19 can be produced using photolithography if the region is a transparent glass substrate, and can be produced using the 2P method or the metallic molding if the region is a transparent resin substrate.

Next, the principle of operation of the optical pickup apparatus 10 will be described. On the basis of the optical signal which is obtained from each light-receiving region, a focus error signal and a radial error signal is generated by a servo signal generation section at the latter stage (not shown), on the basis of a servo signal, focus servo control and radial servo control are performed by a servo signal processing section (not shown), and position control in the focus direction and the track direction of the objective lens 29 equipped with an actuator not shown is performed such that it tracks the light spot concentrated by the objective lens 29 in a predetermined track of the optical recording medium 11. They are realized by the driving control section which controls the servo signal generation section, the servo signal processing section, and the actuator which are not shown.

Specifically, when the focus error signal is represented by "FES", the focus error signal FES is a difference FES between the electric signals Sa and Sb detected by the first light-receiving region 6a and second light-receiving region 6b which receive the optical signal diffracted by the first focus region A or the second focus region B of the diffraction region 19, and the difference is given by:

$$FES = Sa - Sb \tag{8}$$

That is, using a knife edge in which the knife edge portion 26 in the diffraction region 19 is set as the boundary, focus servo control is performed in the knife edge method. In particular, the light, which is concentrated by the knife edge, is only one concentrated light spot having a point shape or a shape similar thereto. Therefore, even when the posture of the light-receiving element 6 is rotated or shifted in the XY directions on the plane perpendicular to the optical axis direction Z, it is possible to correct the posture of the diffraction element 16 through adjustment of rotation and shift in the XY directions on the plane perpendicular to the optical axis direction Z in the same manner. Accordingly, it is possible to detect the focus error signal FES all the time, and thus it is possible to stably perform focus servo control. Hereinafter, the values of the electronic signals, which are outputted as a result of detection from the first to sixth light-receiving regions 6a to 6f, are respectively referred to as Sa, Sb, Sc, Sd, Se, and Sf. One focus region 22 corresponds to one type of light. This means that one type of light is made to be incident to the predetermined point on the light-receiving region, that is, the point 9a which is positioned near the boundary line between the first and second light-receiving regions 6a and 6b in this description.

Further, when the radial error signal is represented by "RES", the radial error signal RES is calculated from the electric signals Se and Sf detected by the fifth and sixth light-receiving regions 6e and 6f in the push-pull method. Thereby, it is given by:

$$RES = Se - Sf \tag{9}$$

Further, in the DPD method which is a method different from the above, it can be obtained by performing the calculation of:

$$RES = Phase(Se - Sf) \tag{10}$$

Therefore, it is possible to perform stable servo control, and thus it is possible to concentrate the light onto the desired track of the optical recording medium 111.

In the case of using the DPD method, at least in the fifth and sixth light-receiving regions 6e and 6f, the phase of the incident light is detected. In the above-mentioned Expression (10), "Phase(Se−Sf)" represents the phase difference of light obtained from the fifth and sixth light-receiving regions 6e and 6f.

When the reproducing signal is represented by "RF", it is possible to stably reproduce the reproducing signal RF of the track by calculating:

$$RF=Sa+Sb+Sc+Sd+Se+Sf \qquad (11).$$

Further, in the first embodiment, the widths Wa and Wb of the parallel dividing lines 27 of the first focus region A and the second focus region B are set to be greater than or equal to five pitches of the pitch dB of the diffraction grating in the region B which has a larger area, and the ratio of widths Wa and Wb is set to 1:1. However, the ratio of the pitches is not limited to 1:1. For example, when the first wavelength is used and when the second wavelength is used, in order to adjust the signal strength of the output servo signal, the adjustment may be performed by changing the ratio.

Specifically, for example, when the light-receiving sensitivity to the light with the first wavelength is lower than the sensitivity to the light with the second wavelength, the area proportion of the first focus region A to the second focus region B is set to be large, whereby it is possible to increase the signal amplitude of the focus error signal FES and the RF signal for light with the first wavelength. Thereby, it is possible to improve an S/N ratio (signal to noise ratio), and it is possible to improve the signal quality. As described above, the area proportion of the first focus region A and the second focus region B may be determined in consideration of the light-receiving sensitivity of each light-receiving region to the light of each type having different wavelength.

Further, in the first embodiment, the positions of the concentrated light spots 9e and 9f incident to the light-receiving element 6 are in the straight lines L1 and L3, and the range of the fifth and sixth light-receiving regions 6e and 6f in the radial direction X are set to be substantially equal to the sum of the size of the light-receiving regions 6a and 6b in the radial direction X and the size of the fourth light-receiving region 6d in the radial direction X. However, the invention is not limited to this, and in accordance with the light concentration positions of the concentrated light spots 6e and 6f, the light-receiving regions 6e and 6f may be determined by the sizes thereof in the radial and tangential directions so as to be able to receive the light with the first and second wavelengths.

Figure 4:
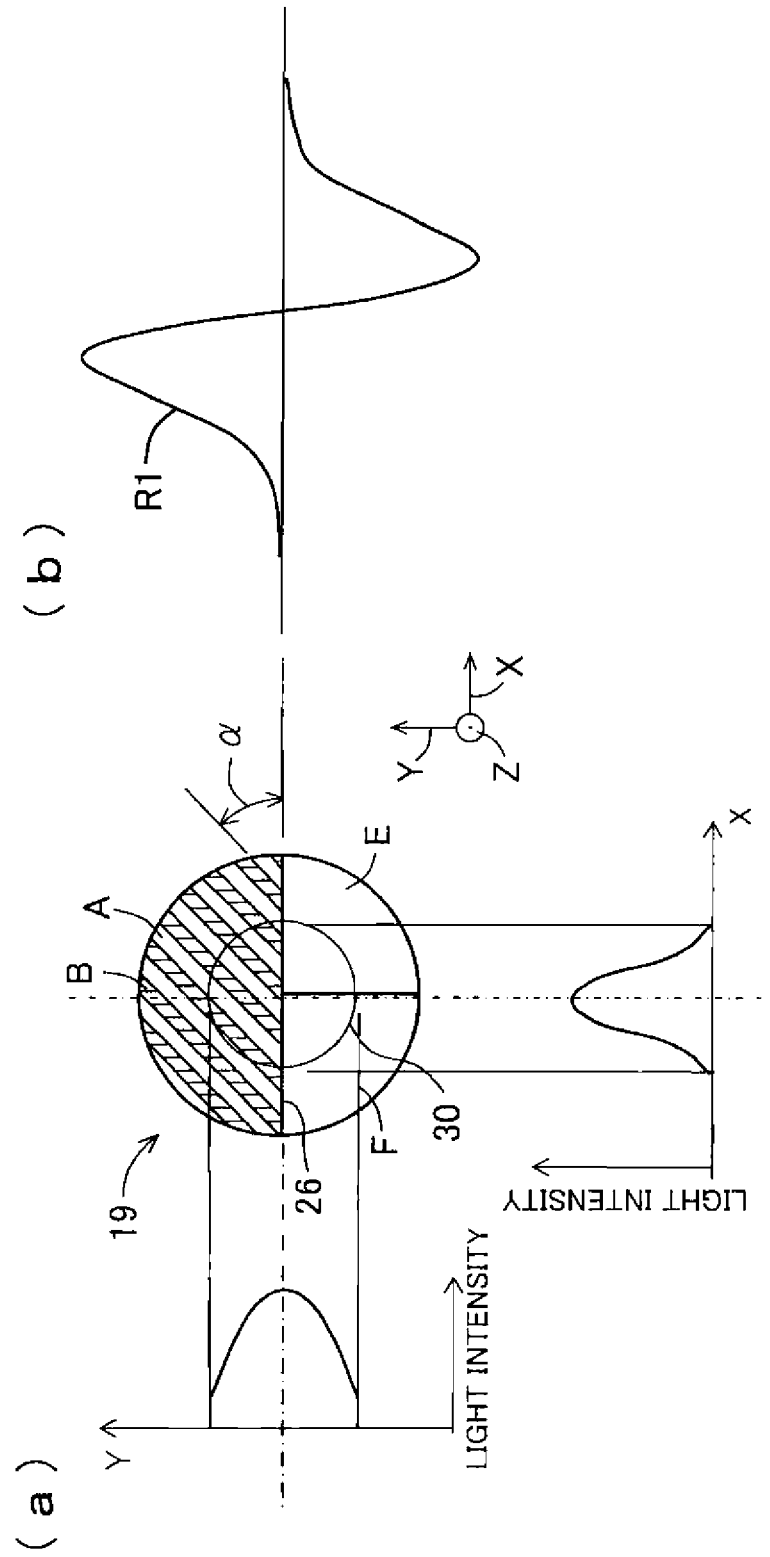
FIGS. 4(a) and 4(b) are a top plan view of the diffraction element according to the first embodiment of the invention and a diagram illustrating an output focus error signal R1.
Figure 5:
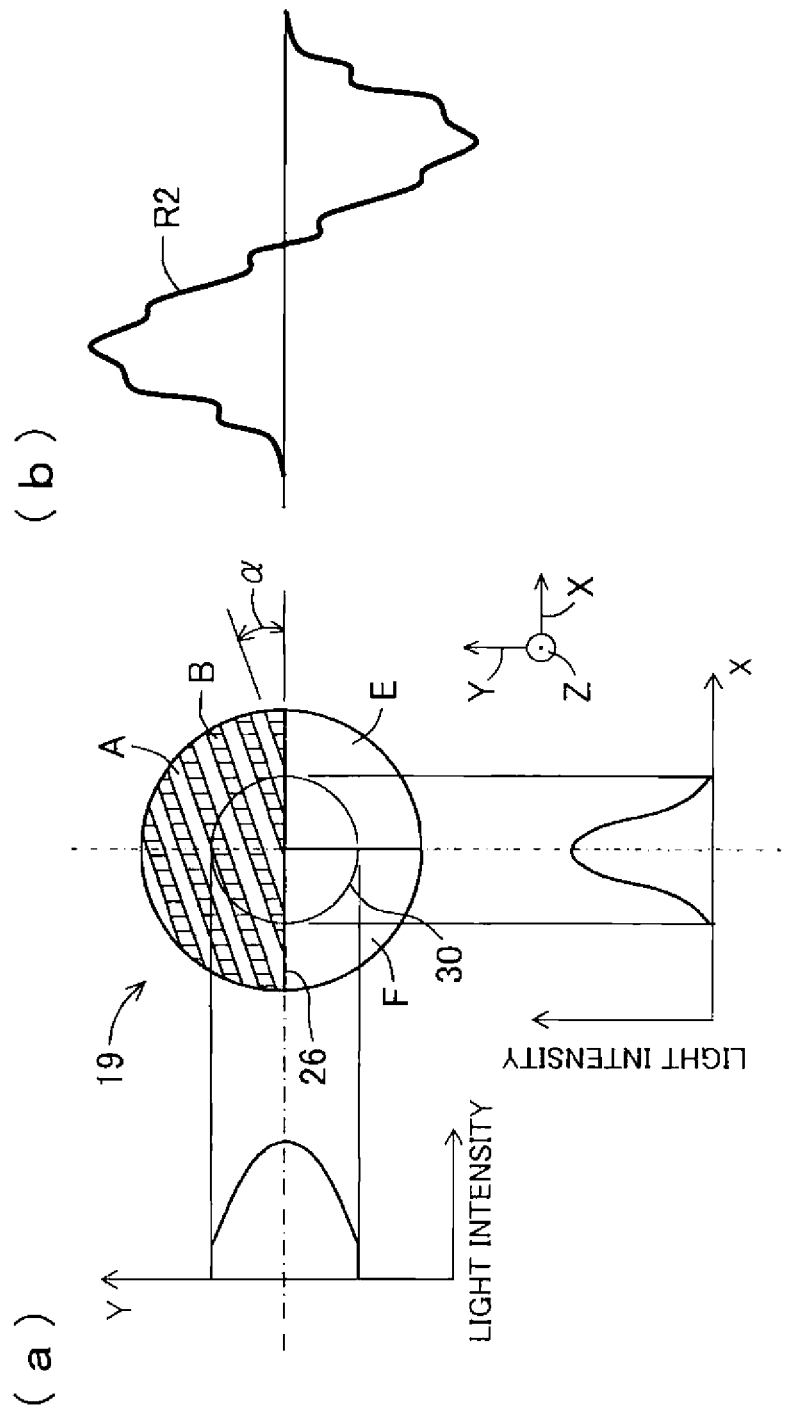
FIGS. 5(a) and 5(b) are a top plan view of the diffraction element according to a comparative example and a diagram illustrating an output focus error signal R2.

FIGS. 4(a) and 4(b) are a top plan view of the diffraction element 16 according to the first embodiment of the invention and a diagram illustrating the distribution of the intensity of the light incident to the diffraction element 16 and the output focus error signal. FIGS. 5(a) and 5(b) are a top plan view of the diffraction element 16 according to a comparative example and a diagram illustrating the distribution of the intensity of the light incident to the diffraction element 16 and the output focus error signal. FIG. 4(a) shows, in the first embodiment, the intensity distribution of the light incident to the diffraction element 16, in which the angle α formed between the knife edge portion 26 and the parallel dividing lines 27 is set to 45 degrees, in the X and Y directions passing through the diffraction element 16 and the center point P0, where the vertical axis represents the light intensity and the horizontal axis represents the sizes of the diffraction region 19 in the X direction and Y direction. However, for convenience of description, the light from the optical recording medium 11 is regarded as reflected light in a case where the light is concentrated on a mirror surface on which tracks are not formed. In practice, the tracks or pits are formed on the optical recording medium 11, and the intensity distribution of the reflected light is altered in accordance therewith, but the description thereof will be omitted herein. FIG. 4(b) shows the focus error signal FES, which is outputted using the diffraction element 16 according to the first embodiment when the actuator is vertically vibrated with a regular time interval, and the characteristic R1 when the horizontal axis represents the time and the vertical axis represents focus error signal FES. FIG. 5(a) shows, in the comparative example, the intensity distribution of the light incident to the diffraction element 16, in which the angle α formed between the knife edge portion 26 and the parallel dividing lines 27 is set to 15 degrees, in the X and Y directions passing through the diffraction element 16 and the center point P0, where the vertical axis represents the light intensity and the horizontal axis represents the sizes of the diffraction region 19 in the X direction and Y direction. FIG. 5(b) shows the focus error signal FES, which is outputted using the diffraction element 16 according to the comparative example when the actuator is vertically vibrated with a regular time interval, and the characteristic R2 when the horizontal axis represents the time and the vertical axis represents focus error signal FES. The vertical direction is a direction in which the objective lens 29 approaches and is separated from the optical recording medium, and a direction in which the value of the focus error is altered by vibration.

It is preferable that the angle α formed between the knife edge portion 26 and the parallel dividing lines 27 is 30 degrees or more and 150 degrees or less. In the first embodiment, the angle is set to 45 degrees. Thereby, even in a case where the diameter of a light beam 30 incident to the diffraction region 19 is enlarged or reduced by the vertical shift of the objective lens 29, it is possible to reduce change in the light intensity distribution.

For example, when the intensity distribution of the light emitted by the light source 12 is long in the tangential direction Y and is short in the radial direction X as shown in the light intensity distribution in FIG. 4(a), the angle α is set to 45 degrees in the widthwise direction of the light intensity distribution, that is, the radial direction X. Thereby, even when the light beam is enlarged or reduced, the strong intensity area in the light intensity distribution is unlikely to deviate from the first focus region A and the second focus region B. Accordingly, the dependence property R1 of the focus error signal FES with respect to the driving amount of the actuator has a smooth shape, and thus it is possible to stably perform focus servo control.

In contrast, as shown in FIG. 5(a), the angle α formed between the knife edge portion 26 and the parallel dividing lines 27 may be set to be less than 30 degrees, for example, the angle may be set to 15 degrees. In this case, when the light beam incident to the diffraction region 19 is enlarged or reduced by vertical shift of the objective lens 29, sometimes the strong intensity area in the light intensity distribution may deviate from the first focus region A and the second focus region B. Thereby, fluctuation in light amount of the light, which is incident to the light-receiving region on the light-receiving element 6, increases. Accordingly, since the focus error signal FES has a multi-step shape, it is difficult to perform stable focus control. Although the angle α formed between the knife edge portion 26 and the parallel dividing lines 27 is not limited to 45 degrees, in order to smooth the shape of the dependence property R1 of the smooth focus error signal with respect to the driving amount of the actuator, it is preferable that the angle α is 30 degrees or more and 150 degrees or less. Further, as shown in FIG. 2A, the angle α may be 90°, that is, may be perpendicular to the knife edge portion 26. In this case, when the focus error signal FES is acquired, the objective lens 29 shifts in the optical axis direction Z. Hence, the spot shape of the reflected light from the optical recording medium 11 incident to the diffraction region 19 is reduced. Since the light source 12 is the semiconductor laser element, in the far-field pattern, the light intensity distribution is elliptical normal distribution. When the long-axis direction of the ellipse coincides with the tangential direction Y, the direction is the same as that of the knife edge portion 26. Hence, it is possible to maintain linearity in the optical signal strength of the light incident to the first and second light-receiving regions 6a and 6b relative to a large or small shift amount of the reflected light spot incident to the diffraction region 19, and thus it is possible to stably detect the focus error signal FES.

According to the first embodiment, the focus diffraction region 21 in the optical pickup apparatus 10 has the focus regions 22 of which the number of types is equal to the number of types of light that can be emitted by the light source. The respective types of the focus regions 22 correspond to the respective types of the light, and the respective focus regions 22 diffract the corresponding types of light toward the focus light-receiving regions 17. Further, the respective types of focus regions 22 include a plurality of focus segmented regions. The plurality of focus segmented regions, into which the respective types of focus regions 22 are divided, are disposed to be distributed in a periodic manner in the focus diffraction region 21.

Thereby, it is possible to share the focus light-receiving region 17 for the uses of the plurality of types of light having different wavelengths. Since the plurality of focus segmented regions of the respective types of focus regions 22 are disposed to be distributed in a periodic manner in the focus diffraction region 21, it is possible to prevent a strong part or a weak part of light intensity of the light beams from being unevenly incident to a certain focus region 22 of the plurality of types of the focus regions 22.

Further, even when the incidence position of the light beam 30 incident to the diffraction element 16 is shifted on the diffraction element 16, it is possible to prevent the intensity of the light incident to the focus region 22 of each type from being altered by the positional shift. Accordingly, even when the incidence position of the light beam 30 incident to the diffraction element 16 is shifted, it is possible to stably perform the focus servo. Thereby, it is not necessary to provide a plurality of diffraction elements 16, and thus it is possible to simplify the configuration of the apparatus. Further, since the difference in position of the light source 12 with respect to the diffraction element 16 has no great effect on the light intensity of the light incident to the focus region 22 of each type, it is possible to easily adjust the positions of the components.

Further, according to the first embodiment, the predetermined part of the outer periphery of the focus diffraction region 21 is defined by the knife edge portion 26 which is linear. The knife edge portion 26 intersects with the incident region, which the reflected light 18 from the optical recording medium enters, in the diffraction element 16 regardless of type of the reflected light 18. The focus diffraction region 21 is divided into the plurality of focus segmented regions by the plurality of parallel dividing lines 27 arranged in parallel with one another. The plurality of parallel dividing lines 27 are oblique to the knife edge portion 26.

Thereby, the focus segmented region in the vicinity of the knife edge portion 26 is formed in a tapered shape. Accordingly, when the diameter of the light beam 30 incident to the diffraction element 16 is altered, it is possible to prevent a part of the focus segmented region, which is included in a range of incidence of the light beam, and a part of the focus segmented region, which is not included in the range of incidence of the light beam, from being biased to some types of the plurality of types of focus regions 22. Thereby, even when the diameter of the light beam 30 incident to the diffraction element 16 is altered, by preventing the light intensity of the light incident to the focus region 22 of each type from being rapidly altered, it is possible to achieve a smooth change. Accordingly, it is possible to stably perform the focus servo.

Further, according to the first embodiment, the parallel dividing lines 27 are formed at the angle greater than or equal to 30 degrees and less than or equal to 150 degrees with respect to the knife edge portion 26. Thereby, when the diameter of the light beam 30 incident to the diffraction element 16 is altered, it is possible to effectively distribute an area of the part of the focus segmented region, which is included in the range of incidence of the light beam, and an area of the part of the focus segmented region, which is not included in the range of incidence of the light beam, in the plurality of types of focus regions 22. Accordingly, it is possible to stably perform the focus servo.

Further, according to the first embodiment, in the respective focus segmented regions, the plurality of diffraction grooves are formed to be arranged in parallel and in a periodic manner. The diffraction grooves, of which the number is five or more, intersect with the respective focus segmented regions on an imaginary plane which is orthogonal to the diffraction grooves of the respective focus segmented regions. Thereby, it is possible to make the number of diffraction grooves of the respective focus segmented regions, arranged in the direction perpendicular to the diffraction grooves, greater than or equal to the minimum required number in order to effectively perform diffraction. Accordingly, it is possible to effectively perform diffraction in the respective focus segmented regions.

Further, in the first embodiment, the third and fourth light-receiving regions 6c and 6d are arranged to receive the light with the first and second wavelengths. However, the invention is not limited to this, and if the amount of light received by the first and second light-receiving regions 6a and 6b is enough, the third and fourth light-receiving regions 6c and 6d may be removed. In this case, the size of the fifth and sixth light-receiving regions 6e and 6f, which are adjacent to each other in the tangential direction, in the radial direction may be equal to the size of the first and second light-receiving regions 6a and 6b or may be a size approximate thereto.

Further, in the first embodiment, the boundary line of the first and second light-receiving regions 6a and 6b is set as a straight line parallel with the radial direction, but the invention is not limited to this, and the line may be inclined. Considering the wavelength tolerance, the spot shape of the received light is altered at the first reference position 9a as a boundary, and the light may be defocused. Accordingly, in order to correct the defocus, the boundary line may be inclined. Likewise, regarding the shape of the light-receiving region and the sizes in the radial direction and the tangential direction, the above-mentioned embodiment is just an example, and the invention is not limited to the embodiment.

Further, in the first embodiment, the pitch of the grooves of the diffraction region is set such that all the first wavelength light and the second wavelength light are concentrated as the concentrated light spot 9a, which is the spot of the light received at the boundary of the first and second light-receiving regions 6a and 6b, at substantially the same position. However, the invention is not limited to this. Thus, if the light concentration positions are not out of the sixth light-receiving regions 6a and 6b, the light concentration position of the first wavelength light and the light concentration position of the second wavelength light may be slightly shifted.

Figure 6:
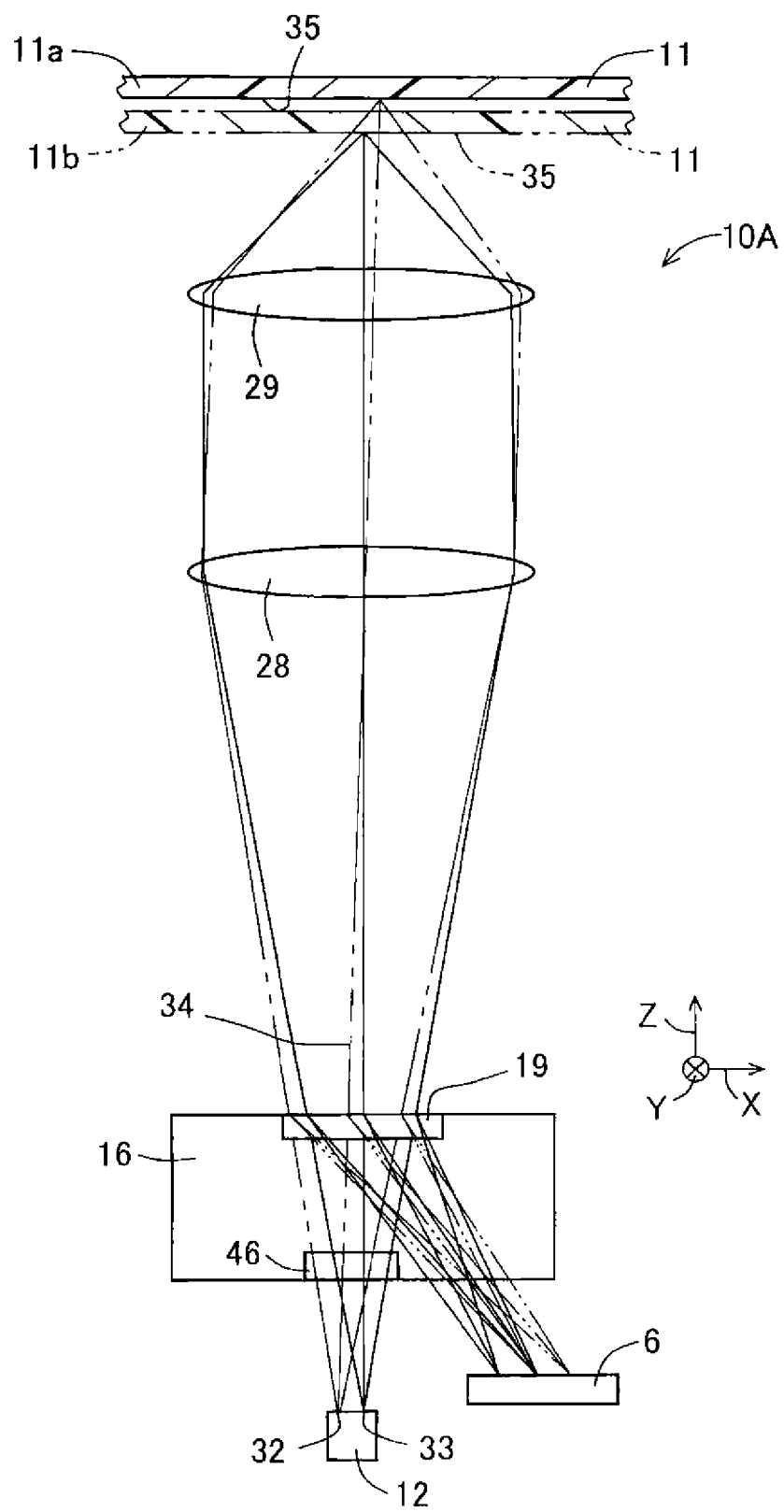
FIG. 6 is a diagram illustrating a configuration of an optical pickup apparatus according to a second embodiment of the invention.
Figure 9:
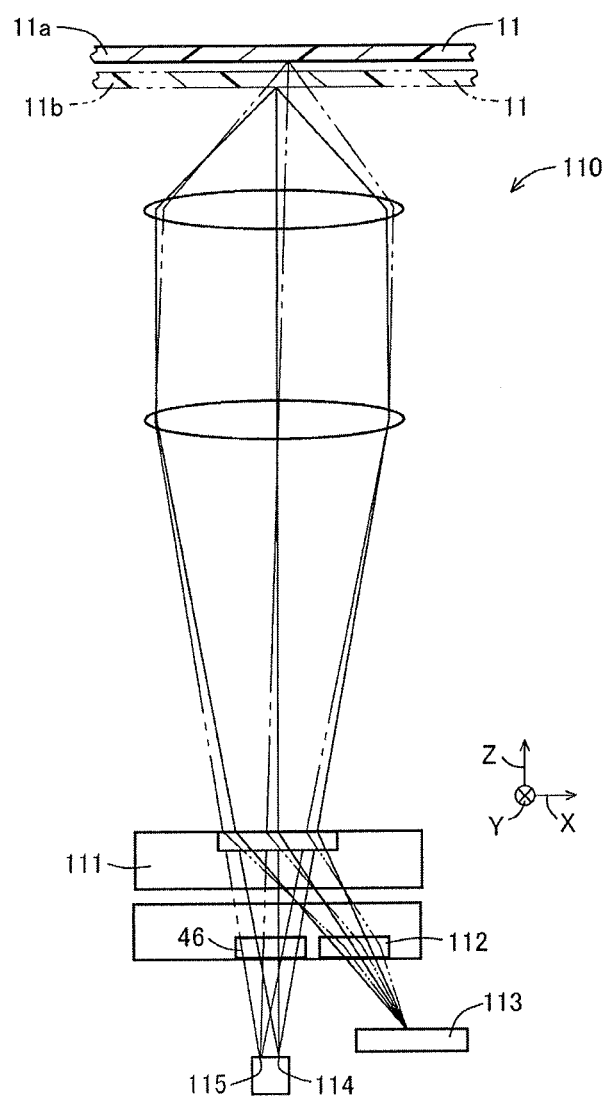
FIG. 9 is a diagram illustrating a configuration of an optical pickup apparatus according to a first related art.
Figure 10:
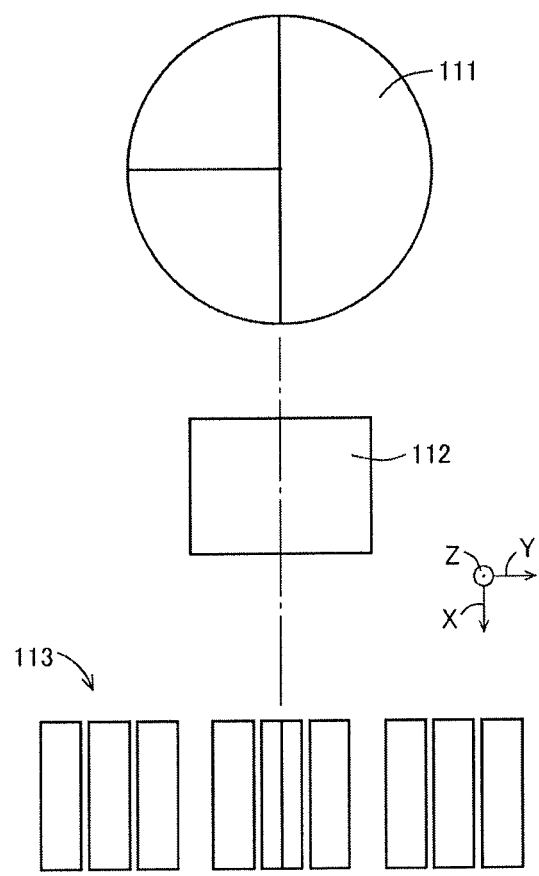
FIG. 10 is a top plan view of a first hologram element, a second hologram element, and a light-receiving element according to the first related art.
Figure 11A:
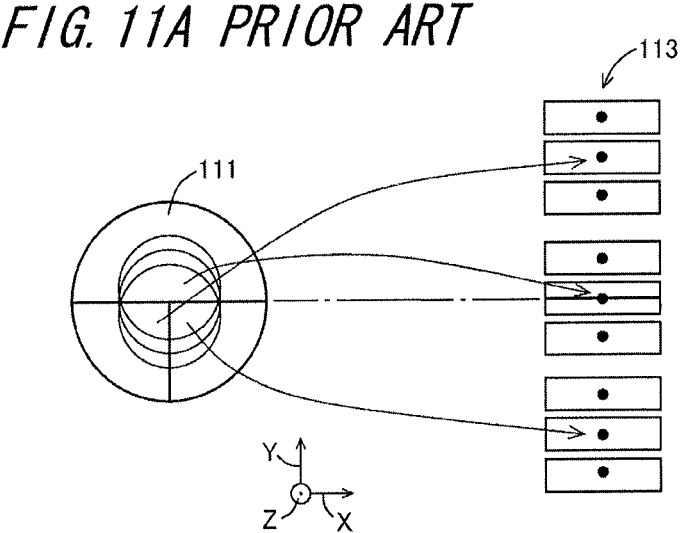
FIG. 11A is a diagram illustrating a relationship between the first and second hologram elements according to the first related art and each light-receiving region at which the light diffracted therethrough arrives.
Figure 11B:
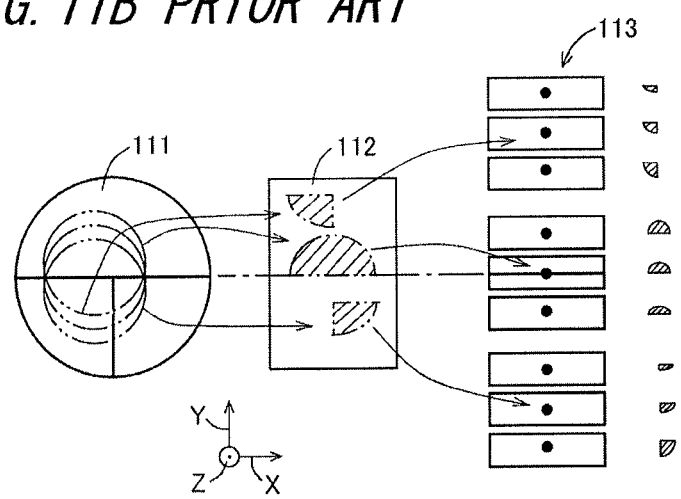
FIG. 11B is a diagram illustrating a relationship between the first and second hologram elements according to the first related art and each light-receiving region at which the light diffracted therethrough arrives.
Figure 12:
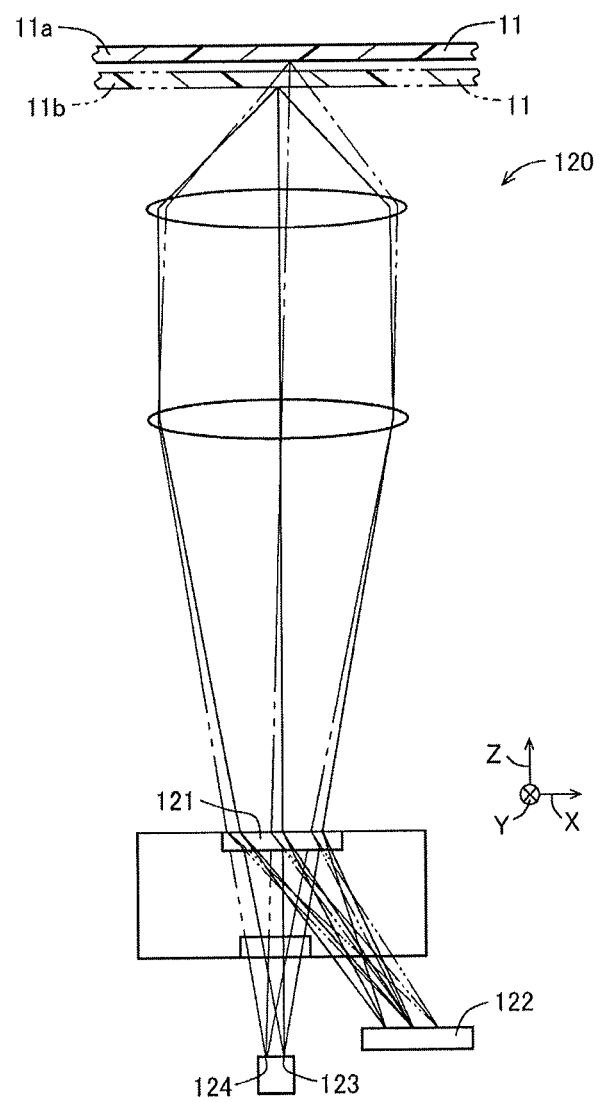
FIG. 12 is a diagram illustrating a configuration of an optical pickup apparatus according to a second related art.
Figure 13:
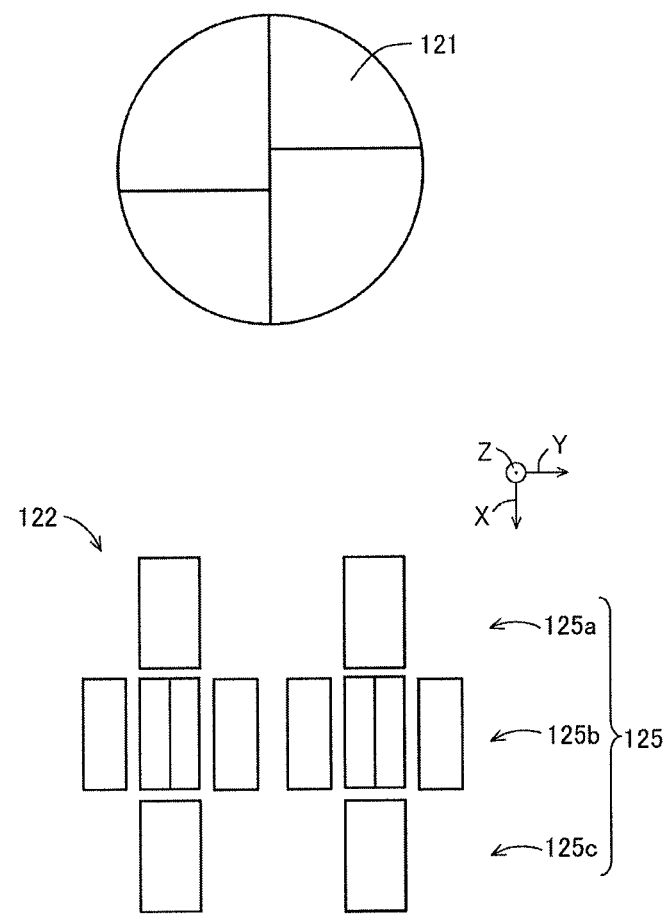
FIG. 13 is a diagram illustrating a top plan view of the diffraction element according to the second related art and the light-receiving element.
Figure 14A:
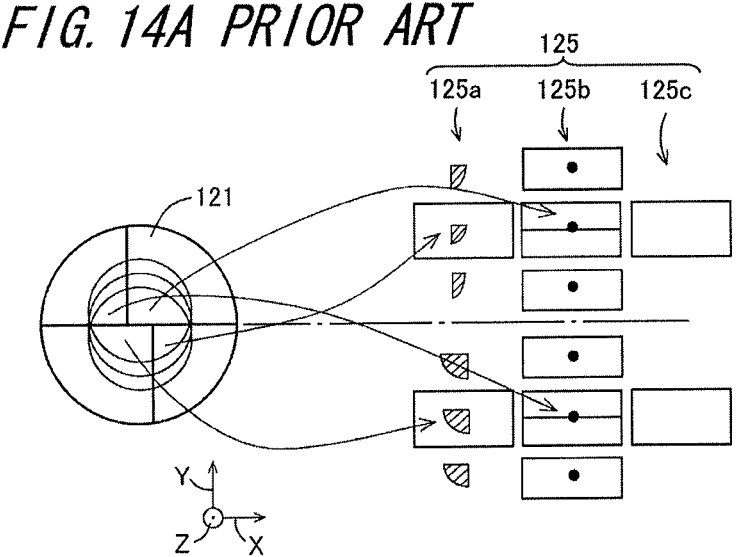
FIG. 14A is a top plan view of the diffraction element according to the second related art and the light-receiving element.
Figure 14B:
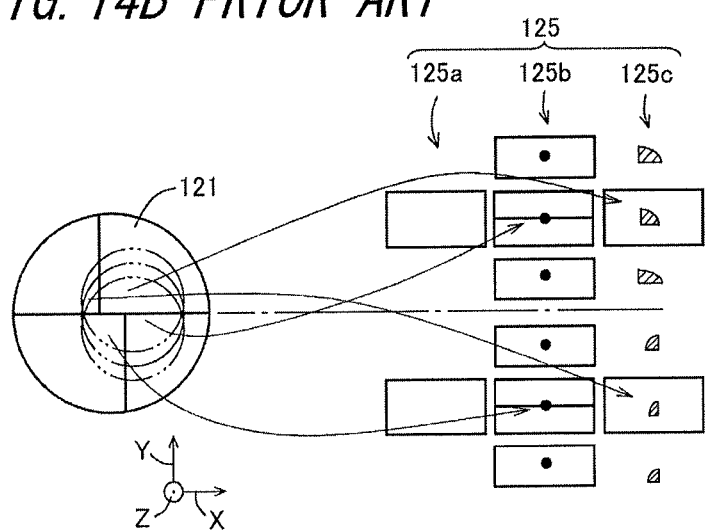
FIG. 14B is a top plan view of the diffraction element according to the second related art and the light-receiving element.

FIG. 6 is a diagram illustrating a configuration of an optical pickup apparatus 10A according to a second embodiment of the invention. FIG. 7 is a top plan view illustrating the diffraction element 16 and the light-receiving element 6 according to the second embodiment of the invention. FIGS. 8A and 8B are diagrams illustrating relationships between the diffraction element 16 according to the second embodiment of the invention and each light-receiving region at which the light diffracted therethrough arrives. Since the optical pickup apparatus 10A according to the second embodiment is similar to the optical pickup apparatus 10 according to the first embodiment, hereinafter, description will be given centering on the differences of the second embodiment from the first embodiment.

The plurality of light-receiving regions have tracking light-receiving regions, and the tracking light-receiving regions are used in tracking servo for tracks of the optical recording medium 11. The diffraction element 16 has the tracking diffraction region 36 which is divided into a plurality of regions by dividing lines 39, 40a, and 40b, and the tracking diffraction region 36 diffracts at least a part of the reflected light 18, which is reflected by the optical recording medium toward the tracking light-receiving regions. The tracking diffraction region 36 has tracking regions 38 of which the number of types is equal to the number of types of light that can be emitted by the light source 12. The respective types of the tracking regions 38 correspond to the types of light. The respective tracking regions 38 diffract the corresponding types of light toward the tracking light-receiving regions, and include a plurality of tracking segmented regions. The plurality of tracking segmented regions of the respective types of tracking regions 38 are distributed in a periodic manner in the direction corresponding to the direction of tangent to the track in the tracking diffraction region 36 or in the direction close thereto.

The tracking light-receiving region has the first tracking light-receiving region and the second tracking light-receiving region. The first and second tracking light-receiving regions are used in the tracking servo. The respective tracking segmented regions constituting the respective tracking regions 38 have a first-type diffraction region 41 and a second-type diffraction region 42. The first-type diffraction region 41 diffracts a part of the reflected light 18, which is reflected by the optical recording medium, toward the first tracking light-receiving region. The second-type diffraction region 42 diffracts a part of the reflected light 18 toward the second tracking light-receiving region. The plurality of dividing lines 40a and 40b for dividing the plurality of tracking segmented regions included in the respective types of tracking regions 38 into the first-type diffraction region 41 and the second-type diffraction region 42, are disposed in straight lines extending in the direction corresponding to the direction of tangent to the track in the tracking diffraction region 36. Positions of the respective straight lines in the types of tracking regions 38 depend on a position of the light source 12, which emits a type of light corresponding to each of the tracking regions 38, in the radial direction X. The radial direction X is a direction perpendicular to the direction of tangent to the track.

The tracking light-receiving region selectively receives light, which is diffracted by one type of tracking regions 38 among the plurality of types of tracking regions, in accordance with the types of the reflected light 18 which is reflected by the optical recording medium.

The light-receiving element 6 has 10 light-receiving regions of the first to tenth light-receiving region 6a to 6j. The third light-receiving region 6c receives the light with the first wavelength, and the fourth light-receiving region 6d receives the light with the second wavelength. Further, 8 light-receiving regions of the first, second, and fifth to tenth light-receiving regions 6a, 6b, 6e, 6f, 6g, 6h, 6i, and 6j receive the light with the first and second wavelengths. The arrangement of the first to fourth light-receiving regions 6a to 6d is the same as that of the first embodiment, and thus description thereof will be omitted. The fifth and sixth light-receiving regions 6e and 6f are disposed at the distance PX from the optical axis 34 of the light emitted by the first light emitting origin 32 of the light source 12 in the + direction of the radial direction X. The fifth light-receiving region 6e is disposed at a position separated by the distance PY in the − direction of the tangential direction Y, and the sixth light-receiving region 6f is disposed at a position separated by the distance PY in the + direction of the tangential direction Y.

The seventh light-receiving region 6g is disposed at a position adjacent to the fifth light-receiving region 6e in the − direction of the tangential direction Y, and the eighth light-receiving region 6i is disposed at a position adjacent to the fifth light-receiving region 6e in the + direction of the tangential direction Y. The ninth light-receiving region 6h is disposed at a position adjacent to the sixth light-receiving region 6f in the − direction of the tangential direction Y, and the tenth light-receiving region 6j is disposed at a position adjacent to the sixth light-receiving region 6f in the + direction of the tangential direction Y. The size of the fifth and sixth light-receiving regions 6e and 6f in the radial direction X is equal to the size of the first and second light-receiving regions 6a and 6b in the radial direction X.

In the optical pickup apparatus 10 according to the second embodiment, a light splitting element 46, which splits the light emitted by the first light emitting origin 32 and second light emitting origin 33 into three beams, is disposed between the light source 12 and the diffraction region 19. The light splitting element 46 is embodied by the diffraction grating, and splits the light emitted by the light source 12 into three of the zeroth-order diffraction light and the ± first-order diffraction light so as to form three beams.

The light, which is emitted by the light source 12 through the light splitting element 46, is concentrated on the main tracks and the sub-tracks of the optical recording medium 11. Further, the plurality of diffraction grooves formed in a linear shape on the light splitting element 46 is set to be perpendicular to the straight line which connects the ideal light concentration position of the zeroth-order diffraction light on the main track and the ideal light concentration position of the ± first-order diffraction light on the sub-track. Similarly to the diffraction element 16, the light splitting element 46 can be formed by photolithography if the element is a transparent glass substrate, and can be formed by the 2P method or the metallic molding if the element is transparent resin. Thereby, the light splitting element 46 generates the zeroth-order diffraction light as a main beam, and the ± first-order diffraction light as sub-beams.

The focus diffraction region 21 formed in the diffraction region 19 is the same as the focus diffraction region 21 according to the first embodiment. The tracking diffraction region 36, which is disposed to be separated from the knife edge portion 26 in the − direction of the tangential direction Y and has a semicircular shape, is divided into a first-type diffraction region 41 and a second-type diffraction region 42. The first-type diffraction region 41 is formed as a diffraction grating that diffracts the incident light with the first wavelength toward the light-receiving regions, and the second-type diffraction region 42 is formed as a diffraction grating that diffracts the incident light with the second wavelength toward the light-receiving regions. The first-type diffraction region 41 is divided into a plurality of regions in the − direction of the tangential direction Y passing through the center point P0 of the diffraction region 19. The dividing line is referred to as a "first-type tracking definition dividing line" (40a). Further, the second-type diffraction region 42 is divided into a plurality of regions in the − direction of the tangential direction Y passing through the point P1 which is shifted by the distance β from the center point P0 of the diffraction region 19 in the + direction of the radial direction X. The dividing line is referred to as a "second-type tracking definition dividing line" (40b). Each of the first tracking region E and the second tracking region F is divided into the tracking regions 38 of which the number corresponds to the number of the types of light having different wavelengths, and here two tracking regions 38 are formed for each. The tracking regions 38 included in the first tracking region E are a "first first-type tracking region" (E1) and a "second first-type tracking region" (E2), and the tracking regions 38 included in the second tracking region F are a "first second-type tracking region" (F1) and a "second second-type tracking region" (F2).

The first tracking region E and the second tracking region F are divided into the plurality of subdivided regions having long and thin shapes by the plurality of dividing lines 39 which are parallel with each other in the radial direction X and are alternately separated by a width Wc and a width Wd from each other. In the first tracking region E and the second tracking region F, the plurality of tracking segmented regions are formed to be divided by either one of the first-type tracking definition dividing line 40a and the second-type tracking definition dividing line 40b which are arranged in the tangential direction Y and are parallel in the radial direction X. The first first-type tracking region E1 is constituted by a plurality of tracking segmented regions surrounded by: the parallel dividing lines 39 with the width Wc among the plurality of tracking segmented regions included in the first tracking region E; the circular arc defining the outer circumference; and the first-type tracking definition dividing line 40a. The second first-type tracking region E2 is constituted by a plurality of tracking segmented regions surrounded by: the parallel dividing lines 39 with the width Wd among the plurality of tracking segmented regions included in the first tracking region E; the circular arc defining the outer circumference; and the second-type tracking definition dividing line 40b. The first second-type tracking region F1 is constituted by a plurality of tracking segmented regions surrounded by: the parallel dividing lines 39 with the width Wc among the plurality of tracking segmented regions included in the second tracking region F; the circular arc defining the outer circumference; and the first-type tracking definition dividing line 40a. The second second-type tracking region F2 is constituted by a plurality of tracking segmented regions surrounded by: the parallel dividing lines 39 with the width Wd among the plurality of tracking segmented regions included in the second tracking region F; the circular arc defining the outer circumference; and the second-type tracking definition dividing line 40b. In the first tracking region E and the second tracking region F, either one of the tracking regions 38 is constituted by the plurality of tracking segmented regions, and corresponds to the light with a wavelength of any one of them.

The first first-type tracking region E1 is disposed such that the respective regions thereof are distributed in a periodic manner in the tangential direction Y, and is disposed in the + direction of the radial direction X from the first second-type tracking region F1. The second first-type tracking region E2 is disposed such that the respective regions thereof are distributed in a periodic manner in the tangential direction Y, and is disposed in the + direction of the radial direction X from the second second-type region tracking F2. The first second-type tracking region F1 is disposed such that the respective regions thereof are distributed in a periodic manner in the tangential direction Y, and is disposed in the − direction of the radial direction X from the first first-type tracking region E1. The second second-type tracking region F2 is disposed such that the respective regions thereof are distributed in a periodic manner in the tangential direction Y, and is disposed in the − direction of the radial direction X from the second first-type tracking region E2.

In the first tracking region E and the second tracking region F, the tracking segmented regions corresponding to the light with the same type are disposed to be adjacent to each other in the radial direction X. Thereby, through the light-receiving region in which the light diffracted in the first tracking region E and the second tracking region F is received, it is possible to detect tracking errors.

In the case of using the light with the first wavelength, the zeroth-order diffraction light through the light splitting element 46, which is incident to the first first-type tracking region E1, is separated by the distance PX from the optical axis 34 of the light emitted by the first light emitting origin 32 of the light source 12 in the + direction of the radial direction X, and is diffracted toward and concentrated on the point 9e in the fifth light-receiving region 6e separated by the distance PY in the − direction of the tangential direction Y. The zeroth-order diffraction light through the light splitting element 46, which is incident to the first second-type tracking region F1, is separated by the distance PX from the optical axis 34 of the light emitted by the light source 12 in the + direction of the radial direction X, and is diffracted toward and concentrated on the point 9f in the sixth light-receiving region 6f separated by the distance PY in the + direction of the tangential direction Y. One tracking region 38 corresponds to one type of light. This means that the one type of light is made to be incident to the predetermined light-receiving region, that is, the fifth light-receiving region 6e and sixth light-receiving region 6f in the case of the zeroth-order diffraction light of the light with the first wavelength, which is diffracted by the light splitting element 46, in this description.

In the case of using the light with the first wavelength, the ± first-order diffraction light through the light splitting element 46, which is incident to and diffracted in the first first-type tracking region E1, is incident to the seventh light-receiving region 6g and the eighth light-receiving region 6i which are adjacent to the fifth light-receiving region 6e in the tangential direction. The ± first-order diffraction light through the light splitting element 46, which is incident to and diffracted in the first second-type tracking region F1, is incident to the ninth light-receiving region 6h and the tenth light-receiving region 6j which are adjacent to the sixth light-receiving region 6f in the tangential direction (refer to FIG. 8A).

In the case of using the light with the second wavelength, the zeroth-order diffraction light through the light splitting element 46, which is incident to the second first-type tracking region E2 of the diffraction element 16, is separated by the distance PX from the optical axis 34 of the light emitted by the first light emitting origin 32 of the light source 12 in the + direction of the radial direction X, and is diffracted toward and concentrated on the point 9e in the fifth light-receiving region 6e separated by the distance PY in the − direction of the tangential direction Y. The zeroth-order diffraction light through the light splitting element 46, which is incident to the second second-type tracking region F2 of the diffraction element 16, is separated by the distance PX from the optical axis 34 of the light emitted by the light source 12 in the + direction of the radial direction X, and is diffracted toward and concentrated on the point 9f in the sixth light-receiving region 6f separated by the distance PY in the + direction of the tangential direction Y.

In the case of using the light with the second wavelength, the ± first-order diffraction light through the light splitting element 46, which is incident to and diffracted in the second first-type tracking region E2, is incident to the seventh light-receiving region 6g and the eighth light-receiving region 6i which are adjacent to the fifth light-receiving region 6e in the tangential direction. The ± first-order diffraction light through the light splitting element 46, which is incident to and diffracted in the second second-type tracking region F2, is incident to the ninth light-receiving region 6h and the tenth light-receiving region 6j which are adjacent to the sixth light-receiving region 6f in the tangential direction (refer to FIG. 8B).

In the first first-type tracking region E1, the second first-type tracking region E2, the first second-type tracking region F1, and the second second-type tracking region F2, the pitches of the plurality of diffraction grooves are represented by dE1, dE2, dF1, and dF2. Regarding the first wavelength λ1 and the second wavelength λ2, similarly to the first embodiment, if λ1<λ2, the magnitude relationship of "dE1<dE2, dF1<dF2" is established. Accordingly, when the zeroth-order diffraction light of the light with the second wavelength passing through the light splitting element 46 is incident to the first first-type tracking region E1 and the first second-type tracking region F1, the diffraction angle at the time of incidence of the light with the second wavelength is larger than the diffraction angle at the time of incidence of the light with the first wavelength. Accordingly, when the light with the second wavelength is incident, as shown in FIG. 8B, the light is concentrated at a position, which is shifted from the fifth and sixth light-receiving regions 6e and 6f in the + direction of the radial direction X, other than the concentrated light spots 9e and 9f at which the light with the first wavelength is concentrated on the light-receiving surface of the light-receiving element 6. Further, similarly to the case of ± first-order diffraction light through the light splitting element 46, the respective concentrated light spots are formed at positions shifted from the seventh to tenth light-receiving regions 6g to 6j.

Further, when the zeroth-order diffraction light passing through the light splitting element 46 is incident to the second first-type tracking region E2 and the second second-type tracking region F2, the diffraction angle at the time of incidence of the light with the first wavelength is smaller than the diffraction angle at the time of incidence of the light with the second wavelength. Accordingly, when the light with the first wavelength is incident, as shown in FIG. 8A, the light is concentrated at a position, which is shifted from the fifth and sixth light-receiving regions 6e and 6f in the − direction of the radial direction X, other than the concentrated light spots 9e and 9f at which the light with the second wavelength is concentrated on the light-receiving surface of the light-receiving element 6. Further, similarly to the case of ± first-order diffraction light through the light splitting element 46, the respective concentrated light spots are formed at positions shifted from the seventh to tenth light-receiving regions 6g to 6j.

The relationship of the diffraction angle, the wavelength, the pitch of the diffraction grooves of the diffraction region 19 is the same as that of the first embodiment of the invention. Further, the calculation of the focus servo signal FES is the same as that of the first embodiment of the invention.

When the electric signals detected by the first to tenth light-receiving regions 6a to 6j are represented by Sa to Sj and the radial error signal is represented by "RES", the radial error signal RES can be detected in the DPP method by calculating $$RES=(Se-Sf)-K\cdot\{(Sg+Sh)-(Si+Sj)\} \quad (12)$$

(K: constant).

At this time, the light emitting origin of the semiconductor laser element is different in the radial direction X between the first wavelength and the second wavelength. In particular, the light emitting origin of the light with the second wavelength is disposed so as to be shifted from the optical axis 34 of the light, which is emitted by the first light emitting origin 32 of the light with the first wavelength of the light source 12, in the + direction of the radial direction X. Thereby, the center of the intensity distribution of the spot of the reflected light 18, which is reflected by the optical recording medium and is incident to the diffraction region 19, is shifted in the + direction of the radial direction X.

If the intersection points between the knife edge portion 26 of the diffraction region 19 and the first-type and second-type tracking definition dividing lines 40a and 40b are the same center point P0 in the first-type diffraction region 41 and in the second-type diffraction region 42, when the light with the second wavelength is incident, systematic asymmetry property occurs particularly in the direct current component of the electric signal detected by the fifth light-receiving region 6e and the sixth light-receiving region 6f. Hence, an offset occurs in the radial error signal RES.

In the second embodiment, the second-type tracking definition dividing line 40b between the regions E2 and F2 of the second-type diffraction region of the diffraction region 19 is disposed in the straight line which passes through the offset point P1 shifted by the distance β from the center point P0 in the + direction of the radial direction X and extends in the tangential direction Y. The center point P0 is a point at the center of the intensity distribution of the reflected light 18, which is incident to the diffraction region 19 and reflected by the optical recording medium for the first wavelength, or a point close to the center. The offset point P1 is a point at the center of the intensity distribution of the reflected light 18, which is incident to the diffraction region 19 and reflected by the optical recording medium for the second wavelength, or a point close to the center. Thereby, on the basis of the positional difference between the first light emitting origin 32 and the second light emitting origin 33, when the light beams with the first and second wavelengths are respectively emitted, it is possible to reduce the residual offset for the radial error signal RES included in the electric signal which is outputted from the light-receiving region in the light-receiving element.

When the light with the first wavelength of which the light emitting origin is on the optical axis of the light 34 emitted by the light source 12 is incident to the diffraction region 19, the center of the intensity distribution of the light is at the center point P0 or in the vicinity thereof. Hence, the first-type tracking definition dividing line 40a between the regions E1 and F1 of the first-type diffraction region 41 is kept to be disposed in the straight line that passes through the center point P0 and extends in the tangential direction Y. Thereby, the structure is made such that the offset is hardly likely to occur in the radial error signal RES based on the light with the first wavelength.

Furthermore, some of the boundary lines of the regions E1, F1, E2, and F2 coincide with the radial direction X. Thereby, it is possible to maintain linearity of the radial error signal RES relative to the amount of radial errors by the shift of the position of the objective lens 29. In a case of the reproducing signal RF, since the zeroth-order diffraction light through the light splitting element 46 is used without using the ± first-order diffraction light, similarly to the first embodiment of the invention, by calculating Expression 11, it is possible to stably detect the reproducing signal RF.

Further, in the second embodiment, similarly to the first embodiment, the width dimensions We and Wd of the first first-type tracking region E1 and the first second-type tracking region F1, and the second first-type tracking region E2 and the second second-type tracking region F2 in the tangential direction Y are set to be greater than or equal to five pitch widths of the pitches dE2 and dF2 of the tracking regions with wider diffraction grooves, that is, the second tracking regions E2 and F2. Further, the ratio of the width dimensions We and Wd is set to 1:1, but the ratio of the width dimensions is not limited to this. The width dimensions and the ratio thereof can be determined in the same manner as the first embodiment and other embodiments mentioned above.

In the description of the first and second embodiments of the invention, a servo signal is detected by the + first-order diffraction light through the diffraction region 19, but the invention is not limited to this. In a different embodiment, on the side of the − first-order diffraction light, the same light-receiving regions 6a and 6b, . . . are disposed, and both of ± first-order diffraction light are used, whereby it may be possible to detect the focus error signal FES using the double knife edge method. Further, with a configuration of the different embodiment, it may be possible to detect a servo signal of the tracking servo.

By using an integration unit in which the light source 12, the light-receiving element 6, and the diffraction element 16 are integrated, that is, a so-called hologram laser, as compared with a case where they are not integrated, it is possible to reduce the sizes of the optical pickup apparatuses 10 and 10A. In this case, regarding other effects, it is also possible to obtain the same effects as the above mentioned embodiments.

Further, in the first and second embodiments, the used light is two types of light having different wavelengths, but the light is not limited to the two types. For example, the light used in the different embodiment may be light having three or more types of wavelengths. In this case, the focus region 22 has three or more types, and the tracking region 38 in the tracking diffraction region 36 has three or more types. However, the first-type diffraction region 41 and the second-type diffraction region 42 are divided in order to be used in detecting the radial error signal. Therefore, the number of the types does not correspond to types of wavelengths of light.

Furthermore, in the first and second embodiments, the focus segmented regions in the focus region are divided by the plurality of parallel dividing lines 27 which are parallel with each other. However, it suffices that the respective focus regions 22 corresponding to the types of the light are disposed to be distributed throughout the entire focus region regardless of type of the focus region 22. For example, the regions may be divided by the dividing lines which pass through the center point P0 and are formed in a radial fashion.

In addition, the plurality of focus segmented regions and the plurality of tracking segmented regions, which are divided by the plurality of parallel dividing lines, may be formed in the focus regions 22 and tracking regions 38 of each type. By setting the minimum number to two, as the number is large for each type, they can be arranged to be uniformly distributed.

Further, the optical axis of the light, which is emitted by the first light emitting origin 32 of the first wavelength, is set to coincide with the center of the optical axis of the optical system of the collimator lens 28 and the objective lens 29, but the invention is not limited to this. For example, the optical axis of the light, which is emitted by the second light emitting origin 33 of the second wavelength, may be set to coincide with the center of the optical axis of the optical system. In addition, the center point between the first light emitting origin 32 of the first wavelength and the second light emitting origin 33 of the second wavelength may be set to coincide with the center of the optical axis of the optical system. In such a case, by appropriately moving the positions of the first-type and second-type tracking definition dividing lines 40a and 40b in the radial direction X in accordance with the corresponding light emitting origins, the invention can be applied.

Furthermore, in the invention, the knife edge method is described for focus servo control, and the DPP method is described for the tracking servo control, but the invention is not limited to this. If the optical pickup apparatus uses the diffraction element, the invention can be similarly applied to the astigmatism method and the beam size method for focus servo control and the DPD method, three beam method, and the like for the tracking servo control, by providing the light-receiving element having corresponding light-receiving regions.

In addition, in the invention, since the knife edge method is used, the knife edge portion 26 serving as the knife edge is formed as a straight line which passes the center of the optical axis 34, but the invention is not limited to this. If the knife edge portion has a structure in which it functions as the knife edge even in the straight line or the curve which passes the point shifted from the center of the optical axis 34, the invention can similarly be applied.

Further, in the invention, the light splitting element 46 that generates three beams is not limited to the generation of three beams having two wavelengths. By providing selectivity of wavelength, three beams may be generated from only one wavelength of them, and light having the other wavelength may be transmitted. In addition, three beams may be generated from a specific wavelength, and light with other wavelengths may be transmitted, and thus may be used as one beam.

Furthermore, in the invention, the configuration has been made such that the semiconductor laser as a light source and the light-receiving element are arranged to be close to each other, but the invention is not limited to this. By providing the splitting optical element such as a beam splitter in the course of the optical path of the returning light which is reflected by the optical recording medium, the outgoing light, which is emitted by the semiconductor laser, is split, and the optical axis of the returning light is deflected. In addition, in the optical pickup apparatus provided with the condensing lens and the light-receiving element, by providing the diffraction element according to the invention in the optical path of the returning light, the invention can be similarly applied.

The invention may be embodied in other specific forms without dediving from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

The invention claimed is:
1. An optical pickup apparatus comprising:
   a light source capable of emitting a plurality of types of light having different wavelengths, an optical recording medium being irradiated with the plurality of type of light;

a light-receiving element having a plurality of light-receiving regions, some of the plurality of light-receiving regions being used as focus light-receiving regions for a focus servo; and a diffraction element having a focus diffraction region for diffracting at least a part of light which is emitted by the light source and reflected by the optical recording medium, toward the focus light-receiving regions, the focus diffraction region including focus regions of which a number of types is equal to a number of the plurality of types of light that can be emitted by the light source, the types of the focus regions corresponding to the plurality of types of light, the respective focus regions diffracting the corresponding types of light toward same positions or vicinities of the focus light-receiving regions, and the focus regions including a plurality of focus segmented regions which are distributed in a periodic manner, at least some of the focus segmented regions being disposed to be adjacent to focus segmented regions for different types of light, the plurality of light-receiving regions including a first light-receiving region and a second light receiving region, the first light-receiving region being disposed between the diffraction element and the focus light-receiving regions as viewed from an optical axis direction of the diffraction element, and the second light-receiving region being disposed on the opposite side of the first light-receiving region with respect to the focus light-receiving regions as viewed from the optical axis direction of the diffraction element.

2. The optical pickup apparatus of claim 1, wherein
a predetermined part of an outer periphery of the focus diffraction region is defined by a knife edge portion which is linear, and the knife edge portion intersects with an incident region, which light reflected by the optical recording medium enters, in the diffraction element regardless of type of the reflected light, the focus diffraction region is divided into a plurality of focus segmented regions by a plurality of parallel dividing lines arranged in parallel with one another, and the plurality of parallel dividing lines are perpendicular or oblique to the knife edge portion.

3. The optical pickup apparatus of claim 2, wherein
the parallel dividing lines are formed at an angle greater than or equal to 30 degrees and less than or equal to 150 degrees with respect to the knife edge portion.

4. The optical pickup apparatus of claim 2, wherein
in the respective focus segmented regions, a plurality of diffraction grooves are formed to be arranged in parallel and in a periodic manner, and the diffraction grooves, of which a number is five or more, intersect with the respective focus segmented regions on an imaginary plane which is orthogonal to the diffraction grooves of the respective focus segmented regions.

5. The optical pickup apparatus of claim 1, wherein
the plurality of light-receiving regions have tracking light-receiving regions used in tracking servo for tracks of the optical recording medium, the diffraction element has a tracking diffraction region for diffracting at least a part of the reflected light toward the tracking light-receiving regions, the tracking diffraction region has tracking regions of which a number of types is equal to the number of types of light that can be emitted by the light source, the respective types of the tracking regions correspond to the types of light, the respective tracking regions diffract corresponding types of light toward same positions or vicinities of the tracking light-receiving regions, and the respective types of tracking regions include a plurality of tracking segmented regions, and the plurality of tracking segmented regions of the respective types of tracking regions are distributed in a periodic manner in a direction corresponding to a direction of tangent to the track in the tracking diffraction region, and at least some of the regions are disposed to be adjacent to the tracking segmented regions for different types of light.

6. The optical pickup apparatus of claim 5, wherein
the tracking light-receiving region has a first tracking light-receiving region and a second tracking light-receiving region used in the tracking servo, the respective tracking segmented regions have a first-type diffraction region for diffracting a part of the reflected light toward the first tracking light-receiving region and a second-type diffraction region for diffracting a part of the reflected light toward the second tracking light-receiving region, a plurality of dividing lines for dividing the plurality of tracking segmented regions included in the respective types of tracking regions into the first-type diffraction region and the second-type diffraction region, are disposed in straight lines extending in a direction corresponding to a direction of tangent to the track in the tracking diffraction region, and positions of the respective straight lines in the types of tracking regions depend on a position of the light source, which emits a type of light corresponding to each of the tracking regions, in a radial direction perpendicular to the direction of tangent to the track.

7. The optical pickup apparatus of claim 5, wherein
the tracking light-receiving region selectively receives light, which is diffracted by one type of tracking regions among the plurality of types of tracking regions, in accordance with the types of the reflected light.

\* \* \* \* \*